(12) United States Patent
Shimoda

(10) Patent No.: US 8,981,022 B2
(45) Date of Patent: Mar. 17, 2015

(54) METHOD OF PRODUCING COMPOSITION HAVING CONTINUOUS PHASE AND DISPERSE PHASE DISPERSED FINELY IN THE CONTINUOUS PHASE AND APPARATUS FOR PRODUCING THE COMPOSITION

(75) Inventor: Mitsuya Shimoda, Fukuoka (JP)

(73) Assignee: Kyushu University, National University Corporation, Fukuoka-Shi (JP)

( * ) Notice: Subject to any disclaimer, the term of this patent is extended or adjusted under 35 U.S.C. 154(b) by 409 days.

(21) Appl. No.: 13/513,066

(22) PCT Filed: Dec. 3, 2010

(86) PCT No.: PCT/JP2010/071658
§ 371 (c)(1),
(2), (4) Date: Aug. 2, 2012

(87) PCT Pub. No.: WO2011/068191
PCT Pub. Date: Jun. 9, 2011

(65) Prior Publication Data
US 2013/0137782 A1    May 30, 2013

(30) Foreign Application Priority Data

Dec. 4, 2009  (JP) ................................ 2009-276136

(51) Int. Cl.
| | | |
|---|---|---|
| C08F 2/00 | (2006.01) | |
| B01F 3/08 | (2006.01) | |
| B01F 5/00 | (2006.01) | |
| B01F 5/04 | (2006.01) | |
| C08F 2/01 | (2006.01) | |

(52) U.S. Cl.
CPC ............. *B01F 3/0807* (2013.01); *B01F 5/0057* (2013.01); *B01F 5/0476* (2013.01); *C08F 2/01* (2013.01)
USPC ........................................ 526/88; 526/219.5

(58) Field of Classification Search
USPC .......................................................... 526/88
See application file for complete search history.

(56) References Cited

U.S. PATENT DOCUMENTS

| | | | |
|---|---|---|---|
| 4,345,841 A | 8/1982 | Day | |
| 6,004,386 A | 12/1999 | Grisham et al. | |
| 2001/0025820 A1 | 10/2001 | Morse et al. | |
| 2005/0228144 A1 | 10/2005 | Kamiya et al. | |
| 2009/0008807 A1* | 1/2009 | Schneider | ..................... 261/124 |
| 2009/0201761 A1 | 8/2009 | Matsuno et al. | |

FOREIGN PATENT DOCUMENTS

| | | |
|---|---|---|
| CA | 2 534 704 A1 | 7/2007 |
| JP | 57-12822 A | 1/1982 |
| JP | 2-095433 A | 4/1990 |
| JP | 5-123570 A | 5/1993 |
| JP | 2003-335804 A | 11/2003 |
| JP | 2005-162848 A | 6/2005 |
| JP | 2007-111616 A | 6/2007 |
| WO | WO 2008/038763 A1 | 4/2008 |

OTHER PUBLICATIONS

Machine English translation of JP 5-123570 published May 21, 1993.
Extended European Search Report issued Aug. 1, 2014, in European Patent Application No. 10834641.2.

* cited by examiner

*Primary Examiner* — Hui Chin
(74) *Attorney, Agent, or Firm* — Birch, Stewart, Kolasch & Birch, LLP

(57) ABSTRACT

There is provided a method of producing a composition having a continuous phase and a disperse phase dispersed finely with low polydispersity in the continuous phase, with high production efficiency. The composition is produced by the production method including the steps of: (A) passing the swirling flow of the continuous phase liquid into a cylindrical body the circumferential surface of which is either in part or entirely formed by a porous membrane, (B1) supplying the disperse phase fluid to the swirling flow via the porous membrane to form the particles of the disperse phase on the porous membrane, and (B2) detaching the disperse phase particles formed on the porous membrane by the shear force of the swirling flow.

17 Claims, 11 Drawing Sheets

Particle Size (μm)

METHOD OF PRODUCING COMPOSITION HAVING CONTINUOUS PHASE AND DISPERSE PHASE DISPERSED FINELY IN THE CONTINUOUS PHASE AND APPARATUS FOR PRODUCING THE COMPOSITION

TECHNICAL FIELD

The present invention relates to a method of producing a composition having a continuous phase and a disperse phase dispersed finely in the continuous phase and to an apparatus for producing the composition.

BACKGROUND ART

A known composition having a continuous phase and a disperse phase dispersed finely in the continuous phase is an emulsion having a continuous phase liquid and a disperse phase liquid dispersed finely in the continuous phase liquid or a microbubble composition having a continuous phase liquid and a disperse phase gas dispersed finely in the continuous phase liquid. A conventional emulsion has been produced by addition of a liquid which serves as a disperse phase and an emulsifier (e.g., a surfactant) to a liquid which serves as a continuous phase in order to form a mixed liquid which is then stirred mechanically to make the disperse phase finer. A known concrete means for the mechanical blending is stirrer, homogenizer, or colloid mill. Another method which has been used is a method of making a disperse phase finer by ultrasonic irradiation to a mixed liquid to thereby generate cavitation.

However, in emulsions produced by these methods, the size of their disperse phase particles was not uniform. In general, the solubility of a disperse phase liquid in a continuous phase liquid depends on the surface curvature of the disperse phase and is represented by the Thompson-Freundlich equation shown below.

$$RT\ln(Ca/C\infty) = (2\gamma/a)\cdot(M/\rho)$$

wherein a represents the radius of disperse phase particles, Ca represents the solubility of the disperse phase particles having radius a, C∞ represents the solubility of the disperse phase liquid in the vicinity of a flat interface, γ represents interfacial tension, M represents the molecular weight of the disperse phase liquid, ρ represents the density of the disperse phase liquid, R represents gas constant, and T represents absolute temperature.

More specifically, the equation shows the following points: the smaller the size of disperse phase particles is, the higher the solubility of the disperse phase in a continuous phase is; and the larger the size of disperse phase particles is, the lower the solubility of the disperse phase in a continuous phase is. Thus, if the size of disperse phase particles is not uniform, when the disperse phase molecules dissolved in a continuous phase (dissolved molecules) exist in the vicinity of smaller disperse phase particles, the dissolved molecules diffuse and move within the continuous phase and are absorbed by larger disperse phase particles. As a result, smaller disperse phase particles gradually become smaller while larger disperse phase particles become larger. This phenomenon to cause the destabilization of an emulsion is also called Ostwald ripening. If the sizes of disperse phase particles can be uniformly controlled, the solubility of the individual disperse phase particles in a continuous phase becomes almost equivalent, and this can prevent the destabilization of an emulsion due to Ostwald ripening.

In addition, an emulsion is broadly used in foods, cosmetics, chemical products, and pharmaceutical products, and the size of its disperse phase particles needs to be changed depending on intended uses. However, it was difficult to control the particle size accurately in conventional production methods. In particular, an emulsion containing polymerizable monomers in its disperse phase is important as a raw material for a suspension polymerization method by which a disperse phase is directly polymerized in the presence of a polymerization initiator. Concerning a suspension polymerization method, there is a particularly strong demand for polymer fine particles having an intended, uniform size, but it was difficult for conventional technology of producing emulsions to satisfy the demand.

In order to solve the above problems, a method of producing an emulsion by pressing a disperse phase into a liquid to serve as a continuous phase via a porous membrane having uniform micropores has been suggested (Patent Document 1: JP 2003-270849A; Patent Document 2: JP H2-95433A). The patent documents each show that the membrane emulsification method enables a disperse phase having an intended and almost uniform particle size to be obtained by the choice of the pore size of the porous membrane. For example, the method disclosed in Patent Document 1 produces a toner having an average particle size of 4 to 15 μm and a polydispersity index D25/D75 of 1.02 to 1.40 (Paragraph [0028]). In the method disclosed in Patent Document 1 or 2, a cylindrical body the circumferential surface of which is formed by a porous membrane is used and a continuous phase liquid is flowed into the cylindrical body in parallel to its axis (hereinafter also referred to as "axial-flow system"). The flow speed of the continuous phase liquid is approximately 0.5 to 2 m/s (for example, Patent Document 2, page 196, upper left column, line 11). According to Paragraph [0024] of Patent Document 1, the volume of the disperse phase liquid to be treated per unit time in the method (hereinafter also referred to as "supply speed $(m^3/m^2 \cdot h)$") is 50 to 1000 ml/min per 1 $m^2$ of a membrane area (3 to $60 \times 10^{-3}$ [$m^3/m^2 \cdot h$]). That is, in the axial-flow system, the supply speed of the disperse phase liquid was as low as $10^{-3}$ order level, which was not sufficient for practical use. Another problem concerning the axial-flow system was that a higher supply speed than this level prevented the production of disperse phase particles having a uniform size; that is, the problem was that the polydispersity increased.

Meanwhile, Non-Patent Document 1 or 2 suggests a method of producing an emulsion efficiently by increasing the supply speed of a disperse phase liquid. Specifically, Non-Patent Document 1 or 2 discloses a method of producing an emulsion characterized by use of an asymmetrically structured porous glass membrane and the supply speed of the disperse phase liquid which is increased to $10^{-2}$ order level (Non-Patent Document 1: Journal of Membrane Science, Vol. 299 (2007), 190-199; Non-Patent Document 2: Masato Kukizaki, Miyazaki Prefecture Industrial Technology Center, "Preparation of Porous Glass Membrane and Its Application to Monodisperse Emulsions and Nanobubbles" ("*Takoushitsu garasumaku no Chousei to Tanbunsan Emarujyon oyobi Nanobaburu heno Ouyou*"), a material for the first lecture for promotion of the cooperation between industry and agriculture). If a porous membrane is likely to get wet with a disperse phase liquid, the particles of the disperse phase generated on the surface of the porous membrane are unlikely to be released from the membrane and thus the supply speed of the disperse phase liquid cannot be increased. However, Non-Patent Document 1 or 2 shows that since the disclosed method uses the asymmetrically structured porous glass membrane, a continuous phase liquid can pass oppositely through the membrane; thus, the membrane is unlikely to get wet with the disperse phase liquid and the particles of the disperse phase are likely to be released from the porous membrane, and this increased the supply speed of the disperse phase liquid.

CITATION LIST

Patent Document

Patent Document 1: JP 2003-270849 A
Patent Document 2: JP H2-95433 A

Non-Patent Document

Non-Patent Document 1: Journal of Membrane Science, Vol. 299 (2007), 190-199
Non-Patent Document 2: Masato Kukizaki, Miyazaki Prefecture Industrial Technology Center, "Preparation of Porous Glass Membrane and Its Application to Monodisperse Emulsions and Nanobubbles" ("*Takoushitsu garasumaku no Chousei to Tanbunsan Emarujyon oyobi Nanobaburu heno Ouyou*"), a material for the first lecture for promotion of the cooperation between industry and agriculture

SUMMARY OF INVENTION

Technical Problem

As described above, in the methods of producing a composition having a continuous phase and a disperse phase dispersed finely in the continuous phase, such as an emulsion, there have been attempts to increase the supply speed of the disperse phase liquid and thereby enhance the efficiency in the production of the composition. However, a further improvement in the supply speed is needed for practical use, but the need has not been satisfied.

In view of these circumstances, the present invention is intended to provide a method of producing a composition having a continuous phase and a disperse phase dispersed finely with low polydispersity in the continuous phase, with high production efficiency.

Solution to Problem

As a result of intensive studies, the present inventors have found that the above problems can be solved by flowing a continuous phase in the form of swirling flow. More specifically, the present invention firstly provides a method of producing a composition having a continuous phase and a disperse phase dispersed finely in the continuous phase, the method comprising the steps of (A) passing the swirling flow of a continuous phase liquid into a cylindrical body the circumferential surface of which is either in part or entirely formed by a porous membrane, and (B) supplying a disperse phase fluid to the swirling flow via the porous membrane. Preferably in the step (A), an inlet for a continuous phase liquid is provided on the circumferential surface of the cylindrical body in the vicinity of one end of the cylindrical body and an inlet tube is provided which extends from the inlet in the substantially vertical direction to the axis of the cylindrical body and the tangential direction to the cylindrical body. The step (A) is preferably carried out by use of the inlet tube to allow the continuous phase liquid in from the substantially vertical direction to the axis of the cylindrical body and the tangential direction to the inner wall surface of the cylindrical body.

Flow linear velocity, which is defined as a value obtained by dividing the flow volume of the continuous phase liquid in the inlet tube by the inner diameter cross-sectional area of the inlet tube, is preferably 1 to 40 m/s. In addition, when the inner diameter cross-sectional area of the cylindrical body is defined as $S1$ and the inner diameter cross-sectional area of the inlet tube is defined as $S2$, the area ratio $S1/S2$ is preferably 4 to 64. Alternatively, when the inner diameter of the cylindrical body is defined as $X1$ and the inner diameter of the inlet tube which is circular in cross-section is defined as $X2$, the inner diameter ratio $X1/X2$ is preferably 2 to 8. Further, when the inner diameter of the cylindrical body is defined as $X1$ and the inner diameter of a circular outlet for ejection of the inventive composition placed on the cross-sectional surface of the other end of the cylindrical body is defined as $X0$, the inner diameter ratio $X1/X0$ is preferably 1 to 5.

The composition obtained by the subject method is preferably an O/W emulsion, W/O emulsion, or a microbubble composition.

Secondly, the present invention provides a method of producing polymer fine particles, the method comprising the steps of (D) passing the swirling flow of a continuous phase liquid into a cylindrical body the circumferential surface of which is either in part or entirely formed by a porous membrane, (E) supplying a disperse phase liquid containing polymerizable monomers to the swirling flow via the porous membrane, (F) obtaining a polymerizable composition having the continuous phase and the disperse phase dispersed finely in the continuous phase, and (G) polymerizing the polymerizable composition.

Thirdly, the present invention provides an apparatus for producing a composition, the apparatus comprising the following: a cylindrical body the circumferential surface of which is either in part or entirely formed by a porous membrane, the cylindrical body having an inlet for a continuous phase liquid on the circumferential surface of the cylindrical body in the vicinity of one end of the cylindrical body and an outlet for a composition having the continuous phase and a disperse phase dispersed finely in the continuous phase which is placed on the cross-sectional surface of the other end of the cylindrical body; an inlet tube which is connected to the inlet and which extends in the substantially vertical direction to the axis of the cylindrical body and the tangential direction to the cylindrical body, so that the continuous phase liquid can flow in from the substantially vertical direction to the axis of the cylindrical body and the tangential direction to the inner wall surface of the cylindrical body; a disperse phase fluid reservoir provided on the outer side of the circumferential surface of the cylindrical body; and a supply means for supplying the disperse phase fluid into the cylindrical body from the disperse phase fluid reservoir.

Advantageous Effects of Invention

The present invention can provide a method of producing a composition having a continuous phase and a disperse phase dispersed finely with low polydispersity in the continuous phase, with high production efficiency.

DESCRIPTION OF EMBODIMENTS

1. Method of Producing Composition

Figure 1:
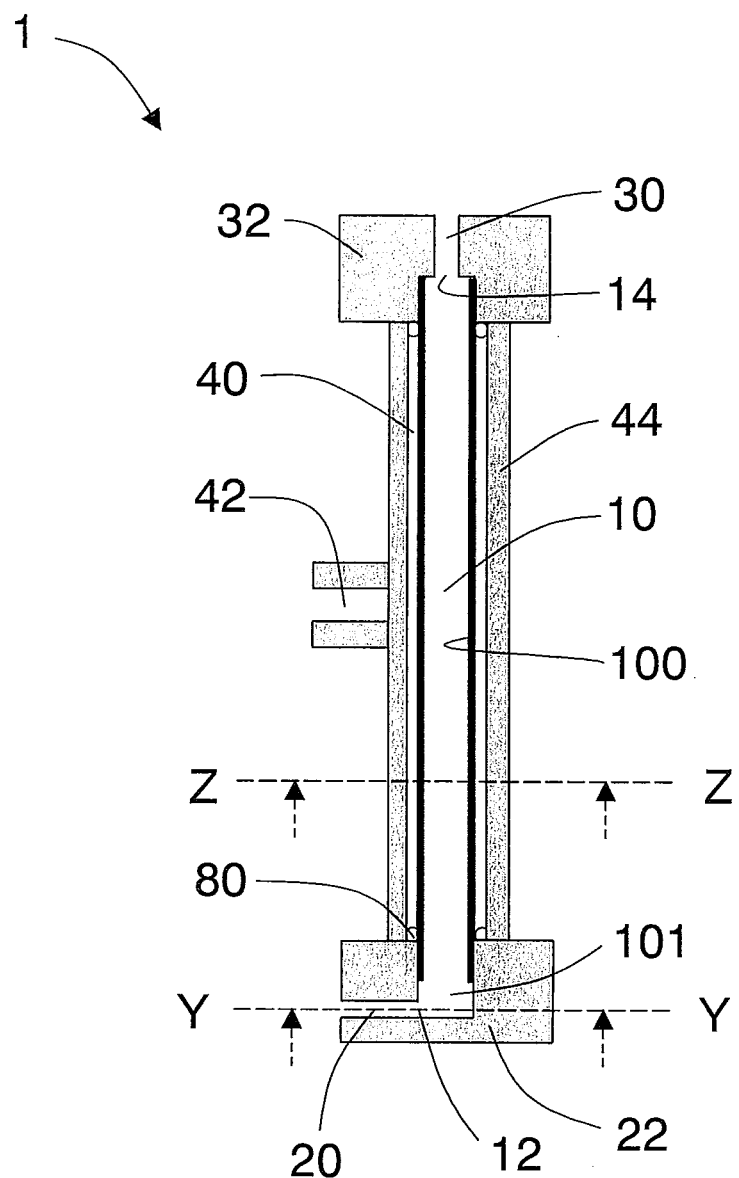
FIG. 1 is a conceptual diagram of a preferred apparatus according to the present invention.

The inventive method of producing a composition having a continuous phase and a disperse phase dispersed finely in the continuous phase includes the steps of (A) passing the swirling flow of a continuous phase liquid into a cylindrical body the circumferential surface of which is either in part or entirely formed by a porous membrane, and (B) supplying a disperse phase fluid to the swirling flow via the porous membrane. The step (B) preferably includes the steps of (B1) supplying the disperse phase fluid to the swirling flow via the porous membrane to form the particles of the disperse phase on the porous membrane, and (B2) detaching the disperse phase particles formed on the porous membrane by the shear force of the swirling flow. The composition having a continuous phase and a disperse phase dispersed finely in the continuous phase means a composition in which disperse phase particles having an average size of 50 μm or less are dispersed in a continuous phase (hereinafter also referred to as "the inventive composition" or "the composition"). The particle size is determined by a laser diffraction scattering method, and the average particle size is defined as the particle size at a cumulative particle mass of 50% ($d_{50}$). In addition, the inventive composition is characterized by low polydispersity. The low polydispersity in the present invention means that the polydispersity represented by the following formula (I) (hereinafter also referred to as "span") is 0.2 to 1.5:

$$\text{Span} = (d_{90} - d_{10})/d_{50} \quad (1)$$

$d_{10}$: the particle size at a cumulative liquid particle (disperse phase particle) distribution of 10%

$d_{90}$: the particle size at a cumulative liquid particle (disperse phase particle) distribution of 90%

$d_{50}$: the particle size at a cumulative liquid particle (disperse phase particle) mass of 50%

Examples of the inventive composition include an emulsion having a continuous phase liquid and a disperse phase liquid dispersed finely in the continuous phase liquid and a microbubble composition having a continuous phase liquid and a disperse phase gas dispersed finely in the continuous phase liquid.

Step (A)

1) Continuous Phase Liquid

In this step, the swirling flow of a continuous phase liquid is passed into a cylindrical body the circumferential surface of which is either in part or entirely formed by a porous membrane. The continuous phase liquid is a liquid to serve as a continuous phase. In the present invention, known continuous phase liquids such as water-based liquids and oil-based liquids can be used. The water-based liquids consist primarily of water. The oil-based liquids consist primarily of organic compounds. High compatibility between the continuous phase liquid and the disperse phase fluid prevents the production of the inventive composition, and thus, the continuous phase liquid is to be chosen in view of its compatibility with the disperse phase fluid to be used.

The continuous phase liquid may be in a liquid state when supplied to the cylindrical body. Thus, for example, a substance which is a solid at room temperature but liquefies by heating can be used as the continuous phase liquid. Alternatively, a supercooled liquid which is in a liquid state at room temperature but solidifies with time can be used. In light of workability, this step is preferably carried out at room temperature (20-30° C.), and the continuous phase liquid is thus preferably in a liquid state at room temperature. Such liquid is largely divided into inorganic substances and organic substances. An example of the inorganic substances is water and examples of the organic substances include various edible oils, petroleum-based fuel oils, chain hydrocarbons having about 20 or less carbon atoms, aromatic hydrocarbons having about 20 or less carbon atoms, and the like.

The continuous phase liquid may contain additives such as surfactant, electrolyte, and viscosity modifier. The surfactant to be used may be known ones, but anionic surfactants or non-ionic surfactants are preferred. Since these surfactants have no positive electric charge, they have an advantage, namely, when a porous glass membrane is used, the surfactant and anions derived from silanol groups of the membrane do not electrostatically attract each other and thus the activity of the surfactant is not reduced. Examples of the anionic surfactant include carboxylate, sulfonate, sulfate, and the like. Examples of the non-ionic surfactant include glycerin fatty acid ester, sucrose fatty acid ester, polyoxyethylenealkylether, and polyoxyethylenealkylphenylether. The amount of the surfactant to be added may be a common amount, but is preferably 0.01 to 5% by mass, more preferably 0.02 to 2% by mass, in the continuous phase liquid.

Examples of the electrolyte include sodium chloride and potassium chloride. Addition of the electrolyte to the continuous phase liquid promotes the formation of an electric double layer on the surface of the porous membrane and can thereby prevent the porous membrane from getting wet with the disperse phase fluid. As a result, the activity of the surfactant is improved and the disperse phase particles generated in the next step can be made smaller. The amount of the electrolyte to be added is preferably 0.5 to 5.0% by mass in the continuous phase liquid.

The viscosity modifier to be used may be known ones, but preferred examples of the viscosity modifier include hydrophilic polymer compounds such as polyvinyl alcohol, pectin, and gelatin.

2) Cylindrical Body

The cylindrical body is a hollow, cylindrical material. The cylindrical body used in the present invention has a circumferential surface which is either in part or entirely formed by a porous membrane. The porous membrane is a membrane having a great many minute through holes. Such a porous membrane that may be used is a known porous membrane made of glass, ceramic, nickel, or the like. In the present invention, a porous glass membrane is preferred and the Shirasu porous glass membranes (hereinafter also referred to as "SPG membrane") disclosed in Non-Patent Documents 1 and 2 are more preferred. The average pore size of the porous membrane to be used can be chosen as appropriate according to intended disperse phase particle sizes, but is preferably 0.5 to 10 μm, more preferably 1 to 5 μm, in order to obtain an industrially advantageous disperse phase particle size. The void ratio and average pore size of the porous membrane can be measured by a mercury intrusion method (using an automatic porosimeter).

The point that the circumferential surface is either in part or entirely formed by a porous membrane means that on the circumferential surface, the portion used to supply the disperse phase fluid may be formed by a porous membrane and the other portion may be formed by another material. However, in the present invention, the entire circumferential surface is preferably formed by a porous membrane so as to enlarge the membrane area available effectively to produce the composition (hereinafter also referred to as "effective membrane area").

In addition, as described later, it is preferred in the present invention that the continuous phase liquid is introduced substantially vertically to the axis of the cylindrical body from the circumferential surface of the cylindrical body. In this case, it is preferred that the entire circumferential surface of the cylindrical body is formed by a porous membrane, and around its portion to which the continuous phase liquid is introduced is treated to ensure that the continuous phase liquid does not leak out of the cylindrical body. Specifically, coating the inner wall surface or outer wall in the corresponding portion of the porous membrane can prevent the continuous phase liquid from leaking out of the cylindrical body. Alternatively, as illustrated by FIG. 1, to the ends of the cylindrical body the circumferential surface of which is formed by the porous membrane, other cylindrical bodies the circumferential surfaces of which are formed by other materials may be connected to form a single cylindrical body for use in the present invention.

The shape and size of the cylindrical body in the present invention are not particularly limited, but the cylindrical body preferably has a cross-sectional area which is constant in the length direction and has an inner diameter of 5 to 100 mm. If the inner diameter is smaller than 5 mm, it can be difficult to generate swirling flow in the cylindrical body, and if the inner diameter exceeds 100 mm, the supply volume of the continuous phase required to generate swirling flow can be excessive. In addition, the length of the cylindrical body is preferably 2 to 50 times as long as the inner diameter. If the length of the cylindrical body is less than 2 times as long as the inner diameter, the effective membrane area is smaller and thus the production efficiency can be lower. In contrast, if the length of the cylindrical body is more than 50 times as long as the inner diameter, the swirling speed can be non-uniform in the cylindrical body. If the swirling speed is not uniform, the dispersed particle size is likely to be non-uniform in the composition.

3) Swirling Flow

The swirling flow is a combination of a flow along the axis of the cylindrical body and a flow along its circumferential surface. The swirling flow can be generated by known methods. For example, while a screw provided at one end of the cylindrical body is rotating, the continuous phase liquid is supplied to the cylindrical body and the resulting swirling flow of the continuous phase liquid can be passed into the cylindrical body. However, in the present invention, it is preferable to pass swirling flow as illustrated by FIG. 1. The generation of swirling flow in this manner gives an advantage such as easy control of the swirling speed. This aspect will be described below with reference to drawings.

Figure 3:
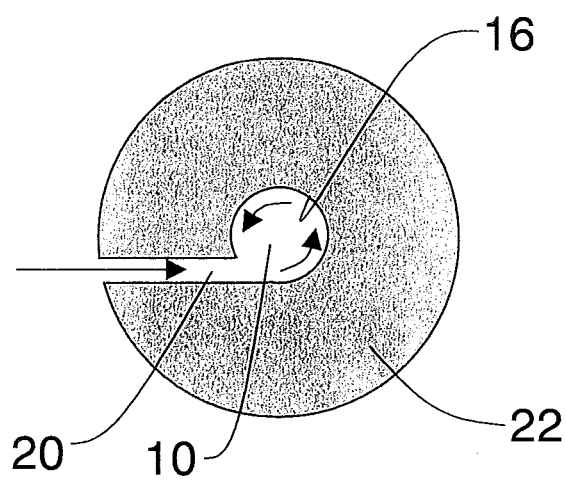
FIG. 3 is a cross-sectional view taken along the plane Y-Y of FIG. 1 and viewed from the direction of the arrows.

FIG. 1 illustrates the outline of a preferred apparatus of the present invention. FIG. 1 shows a production apparatus 1 of the present invention and a cylindrical body 10. In the cylindrical body 10, 100 refers to a porous membrane portion formed by a porous membrane at the circumferential surface of the cylindrical body 10 and 101 refers to a non-porous membrane portion formed by another material at the circumferential surface of the cylindrical body 10. FIG. 1 also shows an inlet 12 for the continuous phase liquid, an outlet 14 for the composition, an inlet tube 20, a member 22 which forms the inlet tube, an outlet tube 30, a member 32 which forms the outlet tube, a disperse phase fluid reservoir 40, an inlet tube 42 for the disperse phase fluid, and a member 44 which forms the disperse phase fluid reservoir. FIG. 1 further shows seal rings 80. FIG. 3 is a cross-sectional view taken along the plane Y-Y of FIG. 1 and viewed from the direction of the arrows. FIG. 3 shows an inner wall surface 16 of the cylindrical body 10.

As illustrated by FIG. 1, the inlet 12 is provided on the circumferential surface in the vicinity of one end of the cylindrical body 10 (i.e., the circumferential surface forming the non-porous membrane portion 101), and to the inlet 12, the inlet tube 20 which extends substantially vertically to the axis of the cylindrical body is connected. The term "vicinity" used herein refers to a range of from the end of the cylindrical body which is defined as the origin, to 0.1, a value based on the total length of the cylindrical body taken as 1. The term "substantially vertically" means that the angle between the axis of the inlet tube 20 and the axis of the cylindrical body 10 is 85° to 95°, preferably 88° to 92°, more preferably 90° (vertical). As illustrated by FIG. 3, the inlet tube 20 extends in the tangential direction to the cylindrical body 10 and the continuous phase liquid can be introduced from the tangential direction to the inner wall surface 16 of the cylindrical body 10. More specifically, a part of the inner wall surface of the inlet tube 20 lies in the same plane as the tangential line to the inner wall surface 16 of the cylindrical body 10. The continuous phase liquid flows along the inner wall surface 16 in its circumferential direction and simultaneously the liquid is pushed to the other end of the cylindrical body 10 to thereby generate swirling flow. More specifically, in the preferred aspect of the present invention, the continuous phase liquid is flowed into the cylindrical body 10 from the vertical direction to its axis along the circumferential surface of the cylindrical body 10 to obtain swirling flow (FIG. 4a), and the preferred aspect is considerably different in this point from a conventional axial-flow system (FIG. 4b).

In the present invention, the speed of the swirling flow in the circumferential direction (hereinafter also referred to as "swirling speed") and the speed in the axial direction of the cylindrical body (hereinafter also referred to as "axial speed"; the swirling speed and the axial speed are also referred to collectively and simply as "swirling flow speed") are preferably controlled by the flow linear velocity, namely, the value obtained by dividing the flow volume of the continuous phase liquid flowing through the inlet tube 20 by the inner diameter cross-sectional area of the inlet tube 20. The flow linear velocity should be optimized under its balance with the inner diameter of the cylindrical body, and is preferably approximately 1 to 40 m/s, more preferably 2 to 20 m/s. If the flow linear velocity falls within this range, a composition characterized by relatively small disperse phase particles and low polydispersity can be obtained efficiently. The cross-section of the inlet tube 20 may have any shape of a square, a circle, and the like, but an inlet tube which is circular in cross-section is preferred because it is easily produced and can easily make uniform the flow of the continuous phase liquid inside the inlet tube 20.

In addition, in the present invention, if a constant relation between the thickness of the inlet tube 20 and the thickness of the cylindrical body 10 is preferred because swirling flow can be generated efficiently in the cylindrical body 10. Concerning the relation between the thicknesses of the cylindrical body 10 and the inlet tube 20, when the inner diameter cross-sectional area of the cylindrical body 10 is defined as $S1$ and the inner diameter cross-sectional area of the inlet tube 20 is defined as $S2$, the area ratio $S1/S2$ is preferably 4 to 64. The inner diameter cross-sectional area means, for example, the cross-sectional area of the portion in the cylindrical body 10 where the continuous phase liquid flows. Specifically, the inner diameter cross-sectional area means the area of the circle having a diameter which is the inner diameter of the cylindrical body 10. In addition, particularly when the inner diameter of the cylindrical body 10 is defined as $X1$ and the inner diameter of the inlet tube 20 which is circular in cross-section is defined as $X2$, the inner diameter ratio $X1/X2$ is preferably 2 to 8.

Further, the size of the outlet 14 influences the aspect of the swirling flow in the cylindrical body 10 and the axial speed (Non-Patent Document 3: Transactions of the Japan Society of Mechanical Engineers, Series B, Vol. 58, No. 550, pp. 1668-1673 (1992)). If the cylindrical body 10 in the present invention has the outlet 14 as shown in FIG. 1, the outlet 14 is preferably circular in cross-section. The reason is that if the outlet 14 is not circular, a composition produced is subjected to non-uniform stress which in some cases breaks disperse phase particles. When the inner diameter of the circular outlet 14 is defined as $X0$, the ratio $X1/X0$ between $X1$, which is the inner diameter of the cylindrical body 10, and $X0$, which is the inner diameter of the outlet 14, is preferably 1 to 5, more preferably 1 to 3. $X0$ can be adjusted according to the shape of the member 32 placed at the end of the cylindrical body 10. The member 32 will be described later.

In the inventive production method, the orientation of placement of the inventive apparatus is not limited, but the apparatus is preferably placed so that the axis of the cylindrical body 10 is substantially vertical. The reason is that when the swirling surface of the continuous phase liquid which makes a swirling motion inside the cylindrical body 10 is perpendicular to the direction of the gravity, the swirling motion is unlikely to be affected by the gravity acceleration. The term "substantially vertical" means that the angle between a horizontal line and the axis of the cylindrical body 10 is 85° to 95°, preferably 88° to 92°, more preferably 90°.

Use of the thus generated swirling flow of the continuous phase liquid enables a composition having a continuous phase and a disperse phase dispersed finely in the continuous phase with low polydispersity to be obtained with high production efficiency. This mechanism is speculated as described below. In general, it is known that when a viscous fluid such as water or oil has contact with a fixed wall, it adheres to the wall surface due to its viscosity. That is, when the liquid is axially flowed in the cylindrical body, the liquid adheres to its wall and thus the flow speed in the vicinity of the wall is markedly lower than the flow speed at positions away sufficiently from the wall. Such a zone is also called boundary layer. More specifically, in a method to supply a disperse phase fluid to an axially flowing continuous phase liquid via a porous membrane (axial-flow system), the flow speed of the continuous phase is not sufficiently high in the vicinity of the porous membrane surface. Thus, the following phenomena occur: 1) the porous membrane surface is likely to get wet with the disperse phase fluid; 2) since the speed at which surfactant molecules contained in the continuous phase are supplied to the disperse phase particles formed at the pore exits of the porous membrane is low, it requires time to reduce the surface tension to thereby release the disperse phase particles from the porous membrane; 3) the shear force which is needed to release the disperse phase particles bound to the pore exits on the porous membrane surface from the porous membrane is unlikely to be generated from the continuous phase liquid; and the like. Thus, if the supply speed of the disperse phase fluid is not low, it is difficult to obtain a composition having a continuous phase and a disperse phase dispersed finely in the continuous phase. If the supply speed of the disperse phase fluid is high, a variation arises in the speed at which the disperse phase particles are released from the porous membrane, and thus the polydispersity is increased.

In contrast, the inflow speed of the continuous phase liquid used in the present invention increases in proportion to the ratio between the inner diameter cross-sectional areas of the cylindrical body 10 and the inlet tube 20 ($S1/S2$). In addition, the continuous phase liquid flows along the inner wall surface of the cylindrical body while making a circular motion (uniformly accelerated motion) (see the arrows in FIG. 5), the boundary layer formed is thus much thinner than in an axial-flow system. For these reasons, 1) the present invention prevents the porous membrane surface from getting wet with the disperse phase fluid; 2) the surfactant molecules contained in the continuous phase can be supplied rapidly to the disperse phase particles formed at the pore exits of the porous membrane; and 3) a shear force needed to release the disperse phase particles covered with the surfactant from the membrane surface can be provided. That is, in the present invention, a strong shear force generated by swirling flow toward the boundary surface of the cylindrical membrane (the periphery of the swirling flow) is used to release the disperse phase particles formed on the porous membrane.

As described above, use of swirling flow enables the disperse phase particles formed at the pore exits of the porous membrane to be released rapidly into the continuous phase. This makes the disperse phase particles obtained smaller in size and the polidispersity lower. Even if the supply speed of the disperse phase fluid is higher, the speed at which the disperse phase particles are detached by the appropriate shear force of the continuous phase liquid does not decrease, which thus can enhance the production efficiency. However, if the speed of the swirling flow is too high, excessive shear force is generated on the porous membrane surface. Hence, in addition to disperse phase particles having an intended size, much smaller disperse phase particles (also referred to as "fine particles" or "satellite particles") are likely to be produced and the polidispersity can increase. In contrast, if the speed of the swirling flow is too low, the shear force is low on the porous membrane surface, and thus the disperse phase particles are unlikely to be detached from the porous membrane and major disperse phase particles are large. In addition, the thin necks of the disperse phase fluid which connect the disperse phase particles and the pores of the porous membrane are elongated and divided into several portions, and as a result, satellite particles are produced and the polydispersity can increase.

Step (B)
1) Disperse Phase Fluid

In this step, a disperse phase fluid is supplied to the swirling flow stated above via a porous membrane. The disperse phase fluid is a fluid to serve as a disperse phase, and examples of the disperse phase fluid include water-based liquids, oil-based liquids, and gases. The water-based liquids are as described in the section Continuous Phase Liquid. Use of the water-based liquid as a disperse phase fluid can produce a W/O emulsion as a composition of the present invention. It is to be noted that it is necessary to keep the porous membrane from getting wet with the disperse phase fluid to achieve the fine dispersion of the disperse phase in a continuous phase via the porous membrane. For this reason, if a water-based liquid is used as a disperse phase, a hydrophobic porous membrane is advantageously used, and if an oil-based liquid or a gas is used as a disperse phase, a hydrophilic porous membrane is preferably used. Further, in either case, the disperse phase fluid preferably does not contain a surfactant so as to prevent the porous membrane from getting wet with the disperse phase fluid.

As already described, the oil-based liquids consist primarily of organic compounds. Use of the oil-based liquid can produce an O/W emulsion as a composition of the present invention. It is to be noted that the oil-based liquid preferably does not contain a surfactant, for the purpose of preventing the porous membrane from getting wet with the oil-based liquid, as described above. As the oil-based liquids, edible oils and fatty acid esters are preferred, but the oil-based liquid can be chosen as appropriate according to the intended use. For example, an emulsion using a fatty acid ester such as methyl laurate as a disperse phase is useful as cosmetic additive, food additive, paint additive, or the like.

In addition, if the oil-based liquid contains polymerizable monomers, an emulsion in which disperse phase particles containing the polymerizable monomers are finely dispersed with low polydispersity can be obtained. The emulsion can be used as a raw material for suspension polymerization. A polymerizable monomer is a compound having a polymerizable functional group, but the polymerizable monomer used in the present invention are preferably radical polymerizable monomers each having a radical polymerizable functional group which can easily polymerize by heating. Examples of the compound include styrene compounds such as styrene, α-methylstyrene, halogenated styrene, vinyl toluene, 4-sulfonamide styrene, and 4-styrene sulfonic acid; and acrylic esters or methacrylic esters such as methyl (meth)acrylate, ethyl (meth)acrylate, propyl (meth)acrylate, n-butyl (meth)acrylate, isobutyl (meth)acrylate, octyl (meth)acrylate, dodecyl (meth)acrylate, and lauryl (meth)acrylate. In addition to these polymerizable monomers, polymerizable monomers having a plurality of polymerizable functional groups in a molecule, such as divinyl benzene, may be used to introduce a cross-linked structure to a polymer obtained.

If the polymerizable monomer is used in the oil-based liquid, a radical polymerization initiator is preferably contained in the oil-based liquid. The radical polymerization initiator is a compound which generates radicals by exposure to heat or the like. Preferred examples of the radical polymerization initiator include 2,2'-azobis(2,4-dimethyl valeronitrile) (ADVN) and benzoyl peroxide. The amount of the radical initiator added is preferably 0.1 to 10 parts by mass relative to 100 parts by mass of the polymerizable monomer. Moreover, the oil-based liquid may contain known coloring agents such as organic dye, organic pigment, inorganic dye, and inorganic pigment. The coloring agent is preferably in the form of nanometer-sized, disperse fine particles.

The emulsion of the present invention which contains polymerizable monomers as a disperse phase gives polymer particles with low polydispersity, namely, monodisperse polymer fine particles. These polymer particles are useful for spacers for liquid crystal displays and fillers for liquid chromatography separation columns, and useful as a raw material of cosmetics or toners. Among these, the inventive composition containing polymerizable monomers as a disperse phase is advantageous in the field of toners which requires polymer particles with very low polydispersity for higher printing resolution.

If the disperse phase fluid is a gas, a microbubble composition in which fine bubbles are dispersed in the continuous phase can be obtained as a composition of the present invention. In this case, the continuous phase may be a water-based liquid or an oil-based liquid. Examples of the gas include air, oxygen, nitrogen, rare gas, carbon dioxide, and ozone. Use of air or nitrogen as a gas can produce a whip composition useful in the production of air-containing foods. Use of carbon dioxide as a gas can produce a microbubble composition useful in the production of carbonated beverages. In addition, fine dispersion of an ozone-containing gas in water as a continuous phase is advantageous in the production of ozone water and also advantageous as a means for sterilization of water. Further, cleaning and sterilization using the water are also important utilization methods.

2) Supply Method

Figure 5:
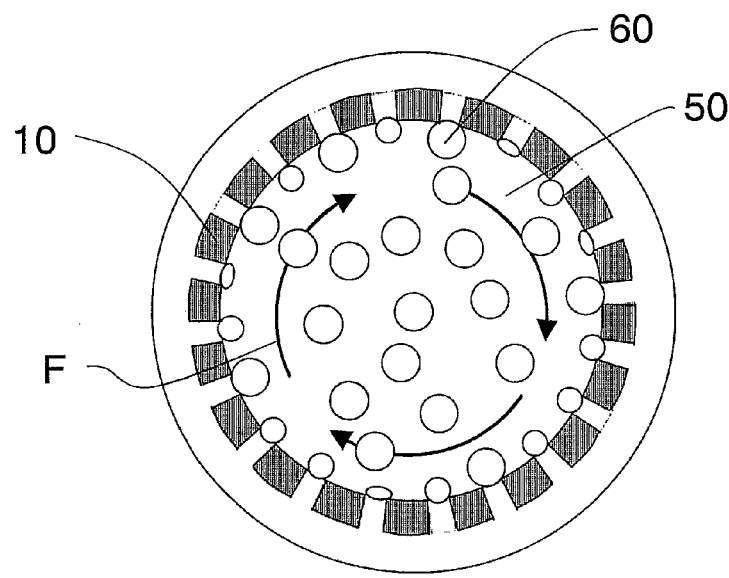
FIG. 5 is a cross-sectional view taken along the plane Z-Z of FIG. 1 and viewed from the direction of the arrows.

The disperse phase fluid is supplied to the continuous phase liquid via the porous membrane. The supply method is not particularly limited. However, as illustrated by FIG. 1, it is preferred that the member 44 is placed around the outer circumference of the cylindrical body 10 to provide the disperse phase fluid reservoir 40 which is filled with the disperse phase fluid to be supplied to the continuous phase liquid with an pressure controller (not shown) for appropriate adjustment of the pressure of the disperse phase fluid. The swirling flow of the continuous phase liquid 50 is generated inside the cylindrical body 10; thus, as soon as the disperse phase fluid 60 is supplied into the cylindrical body 10, it is released from the porous membrane 10 and dispersed into the continuous phase liquid 50 (FIG. 5).

In the present invention, the supply speed ($m^3/m^2 \cdot h$) is preferably $10^{-2}$ to $10^{-3}$ order level under normal conditions (0° C., 1 atm). The supply speed is much higher than the supply speed in a conventional axial-flow system, but in accordance with the present invention, even if the supply speed is increased, a composition characterized by small disperse phase particles and low polydispersity can be obtained. Particularly, if the disperse phase fluid is a liquid, the supply speed is more preferably 0.5 to 3 ($m^3/m^2 \cdot h$).

The temperature for supply of the disperse phase fluid is not particularly limited, but is preferably room temperature (20-30° C.), as described above.

Thus, a preferred aspect of this step is, for example, an aspect including the steps of (B1) supplying the disperse phase fluid to the swirling flow via the porous membrane to form the particles of the disperse phase on the porous membrane, and (B2) detaching the disperse phase particles formed on the porous membrane by the shear force of the swirling flow.

Step of Taking Composition Out (C)

The resulting composition of the present invention is taken out from the outlet 14 provided at one end of the cylindrical body 10. The outlet is preferably provided in a circular shape having a certain inner diameter on the cross-sectional surface of one end of the cylindrical body 10, as already described.

Further, the composition may be taken out through the outlet tube 30 connected to the outlet 14.

2. Composition (1) Size of Disperse Phase Particles

The inventive composition is an O/W emulsion when a water-based liquid is used as a continuous phase liquid and an oil-based liquid is used as a disperse phase fluid; it is a W/O emulsion when an oil-based liquid is used as a continuous phase liquid and a water-based liquid is used as a disperse phase fluid; and it is a microbubble composition when an oil-based or water-based liquid is used as a continuous phase liquid and a gas is used as a disperse phase fluid.

The size of the disperse phase particles is determined by a laser diffraction scattering method, and the average particle size defined as the particle size at a cumulative particle mass of 50% ($d_{50}$) is preferably 1 to 50 µm, more preferably 1 to 30 µm. In addition, the polydispersity defined by the formula (1) shown below (hereinafter also referred to as "span") is preferably 1.5 or less, more preferably 1.0 or less. The lower limit of the polydispersity is preferably 0.2 or more.

$$\text{Span} = (d_{90} - d_{10})/d_{50} \quad (1)$$

$d_{10}$: the particle size at a cumulative liquid particle (disperse phase particle) distribution of 10%

$d_{90}$: the particle size at a cumulative liquid particle (disperse phase particle) distribution of 90%

$d_{50}$: the particle size at a cumulative liquid particle (disperse phase particle) mass of 50%

(2) Composition and Intended Use

The ratio in the inventive composition varies depending on substances to be used and intended uses, but in O/W and W/O emulsions, the mass ratio of the continuous phase to the disperse phase (continuous phase/disperse phase) is preferably approximately 10 to 100, more preferably 10 to 50, in the step of passing swirling flow once through the cylindrical body. Further, the proportion of the disperse phase to the continuous phase can be increased as needed by repeated circulation of an emulsion produced as the continuous phase.

The ratio of the continuous phase to the gas in a microbubble composition varies depending on the type of the gas used and intended uses, but the volume ratio of the continuous phase to the gas (normal conditions) (continuous phase/gas) is preferably 0.1 to 100,000. For example, if a carbonated beverage is produced as a microbubble composition, the volume ratio is advantageously about 0.2, and if ozone water is produced as a microbubble composition, the volume ratio is advantageously about 10,000.

The O/W and W/O emulsion compositions of the present invention are useful as food additives and paint additives, for spacers for liquid crystal displays and fillers for liquid chromatography separation columns, as raw materials of cosmetics or toners, and the like, as described above. The microbubble composition of the present invention is useful in production of whip compositions, carbonated beverages, or ozone water, as described above.

3. Method of Producing Polymer Fine Particles

The method of producing polymer fine particles according to the present invention includes the steps of (D) passing the swirling flow of a continuous phase liquid into a cylindrical body the circumferential surface of which is either in part or entirely formed by a porous membrane, (E) supplying a disperse phase liquid containing polymerizable monomers to the swirling flow via the porous membrane, (F) obtaining a polymerizable composition having the continuous phase and the disperse phase dispersed finely in the continuous phase, and (G) polymerizing the polymerizable composition.

Steps (D) to (F)

These steps are as described in the section on the inventive method of producing a composition. In particular, a preferred aspect of Step (E) is, for example, an aspect including the steps of (E1) supplying the disperse phase liquid containing polymerizable monomers to the swirling flow via the porous membrane to form the particles of the disperse phase on the porous membrane, and (E2) detaching the disperse phase particles formed on the porous membrane by the shear force of the swirling flow.

Step (G)

In this step, the polymrizable composition obtained in the preceding step is polymerized. This polymerization is so-called suspension polymerization and the polymerization conditions such as polymerization temperature and time may be common conditions used in suspension polymerization.

The average size ($d_{50}$) of the polymer particles obtained in the present invention is preferably 1 to 50 µm, more preferably 1 to 30 µm. The polydispersity of the polymer particles is preferably 1.5 or less, more preferably 1.0 or less. The lower limit of the polydispersity is preferably 0.2 or more. Such polymer fine particles are useful for spacers for liquid crystal displays and fillers for liquid chromatography separation columns, and as a raw material of cosmetics or toners, and the like, as described above.

4. Apparatus

The inventive composition can be produced with any apparatus as long as the advantageous effect of the invention is not reduced. However, the inventive composition is preferably produced with an apparatus which has the following: a) a cylindrical body the circumferential surface of which is either in part or entirely formed by a porous membrane, the cylindrical body having an inlet for a continuous phase liquid on the circumferential surface of the cylindrical body in the vicinity of one end of the cylindrical body and an outlet for a composition having the continuous phase and a disperse phase dispersed finely in the continuous phase which is placed on the cross-sectional surface of the other end of the cylindrical body; b) an inlet tube which is connected to the inlet and which extends in the substantially vertical direction to the axis of the cylindrical body and the tangential direction to the cylindrical body, so that the continuous phase liquid can flow in from the substantially vertical direction to the axis of the cylindrical body and the tangential direction to the inner wall surface of the cylindrical body; c) a disperse phase fluid reservoir provided on the outer side of the circumferential surface of the cylindrical body; and d) a supply means for supplying the disperse phase fluid into the cylindrical body from the disperse phase fluid reservoir.

One preferred example of the apparatus will be described below with reference to FIG. 1.

a) Cylindrical Body

The cylindrical body 10 functions as a reactor. The materials which constitute the cylindrical body, its shape, size, and the like are as already described.

b) Inlet Tube

Figure 2:
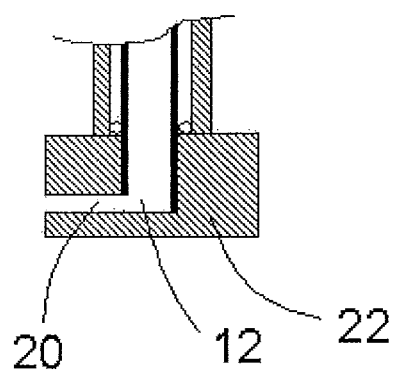
FIG. 2 is a conceptual diagram of another preferred apparatus according to the present invention.

The inlet tube 20 functions to generate swirling flow. As already described, the inlet tube 20 is connected to the inlet 12 provided on the circumferential surface of the cylindrical body 10 and extends in the substantially vertical direction to the axis of the cylindrical body and the tangential direction to the cylindrical body. The adjustment of the thickness of the inlet tube 20 allows the speed of the swirling flow to be adjusted. The inlet tube 20 is preferably formed as illustrated by FIGS. 1 and 2. More specifically, the thick cylindrical member 22 which has almost the same inner diameter as that of the cylindrical body 10 and which is closed at one end is placed at the end of the cylindrical body 10 so that the member 22 caps the end. The member 22 is then provided with a through hole which is vertical to the axis of the cylindrical body 10 and which extends in the tangential direction to the cylindrical body 10; the through hole is the inlet tube 20. The continuous phase liquid 50 passes through the inlet tube 20 and flows in along the inner wall of the non-porous membrane portion 101 which is formed by the member 22 and made of a material other than a porous membrane at the circumferential surface, and this allows for efficient generation of swirling flow. The swirling speed can be adjusted easily according to the size of the through hole. The material of the member 22 is not particularly limited, but stainless steel is preferred in light of its resistance to acid, alkali, and organic solvents.

In addition, as illustrated by FIG. 2, the inlet tube 20 may be provided on a porous membrane portion 100 of the cylindrical body 10. It is to be noted that in this case, the zone of the porous membrane portion 100 in the vicinity of the inlet tube 20 is preferably subjected to coating treatment for prevention of the leakage of the continuous phase liquid.

c) Disperse Phase Fluid Reservoir

It is preferred that the member 44 is placed to cover the outer circumference of the cylindrical body 10, thereby forming the disperse phase fluid reservoir 40 which is a space between the inner wall of the member 44 and the outer wall of the cylindrical body 10. The disperse phase fluid reservoir 40 can supply a disperse phase fluid through the entire porous membrane portion 100 of the cylindrical body 10, and thus the production efficiency is enhanced. In this case, the space, namely, the difference between the inner radius of the member 44 and the outer radius of the cylindrical body 10, is preferably 1.0 to 10 mm, more preferably 1.5 to 4.0 mm. If the space is less than 1.0 mm, there is a possibility that an increased supply speed of the disperse phase fluid causes a pressure distribution inside the reservoir 40, which reduces the uniformity of the speed at which the disperse phase fluid passes through the pores of the porous membrane. In contrast, if the space is unnecessarily wide, the reserve volume of the disperse phase is large and the volume of the disperse phase fluid which is discarded in disassembly or cleaning of the apparatus is also large, which causes waste of resources.

The material of the member 44 is not particularly limited, but stainless steel is preferred in light of its resistance to acid, alkali, and organic solvents. In addition, at the point where the cylindrical body 10, the member 44, and the member 22 are connected, a seal ring may be placed to prevent a liquid from leaking out of the apparatus. Examples of the seal ring include known O-rings.

d) Supply Means

The supply means is not particularly limited, but a pump is preferred because it causes less pulsating flow. The supply means is connected to the disperse phase fluid inlet tube 42 provided on the member 44.

e) Outlet and Outlet Tube

The inventive apparatus preferably has the outlet 14 and the outlet tube 30 at the other end of the cylindrical body 10. The shape and size of the outlet 14 are as already described. The outlet tube 30, which is connected to the outlet 14, has an intended inner diameter, and it is preferred that the cylindrical member 32 having a through hole for ejection is formed at the end of the cylindrical body 10 so that the cylindrical member 32 caps the end. The material of the member 32 is not particularly limited, but stainless steel is preferred in light of its resistance to acid, alkali, and organic solvents.

EXAMPLES

Example 1

The cylindrical body prepared had the circumferential surface entirely formed by a Sirasu porous glass membrane (SPG membrane) having an average pore size of 5.2 μm and the cylindrical body was 10 mm in outer diameter, 9 mm in inner diameter, and 150 mm long (SPG Technology Co., Ltd.; SPG membrane; Lot No.: PJN08J14). Also prepared was a stainless steel cylindrical member 22 which was thicker than the cylindrical body using the SPG membrane, had the same inner diameter as that of the cylindrical body, and was closed at one end. As illustrated by FIG. 1, the member 22 was placed so that it capped the end of the cylindrical body using the SPG membrane to form a 5 mm-long cylindrical space the circumferential surface of which was formed by stainless steel at the end of the cylindrical body using the SPG membrane. A 155 mm-long cylindrical body 10 which had a porous portion 100 and a non-porous portion 101 was thus prepared. In the member 22, a through hole was created which was vertical to the axis of the cylindrical body 10 and which extended in the tangential direction to the cylindrical body 10; the through hole is an inlet tube 20. The inlet tube was circular in cross-section and had an inner diameter of 2.5 mm.

A member 44 was placed so that it covered the outer circumference of the cylindrical body 10 to form a disperse phase fluid reservoir 40. The height of the reservoir 40 (the difference between the inner radius of the member 44 and the outer radius of the cylindrical body 10) was 2.0 mm. At the other end of the cylindrical body 10, a stainless steel cylindrical member 32 having an outlet 4.5 mm in inner diameter was placed so that the cylindrical member 32 capped the end of the cylindrical body 10, in order to form an outlet 14 and an outlet tube 30. As illustrated by FIG. 1, O-rings were inserted into the both ends of the member 44 which were the spaces between the member 44 and the cylindrical body 10. A production apparatus according to the present invention was thus prepared. The production apparatus was placed so that the axis of the cylindrical body was substantially vertical and that the inlet tube 20 lay beneath, as illustrated by FIG. 1.

An aqueous solution containing 1.0% by mass of sodium dodecyl sulfate (SDS) (Nacalai Tesque, Inc.) as a surfactant was prepared to obtain a continuous phase liquid. From an inlet 20, the continuous phase liquid was introduced with a gear pump from the direction of 90° to the axis of the cylindrical body 10 and the tangential direction to the inner wall of the cylindrical body 10 to generate swirling flow. The flow linear velocity was 1.6 to 6.4 m/s in Examples 1 to 3, while it was 1.6 m/s in this example.

Figure 6:
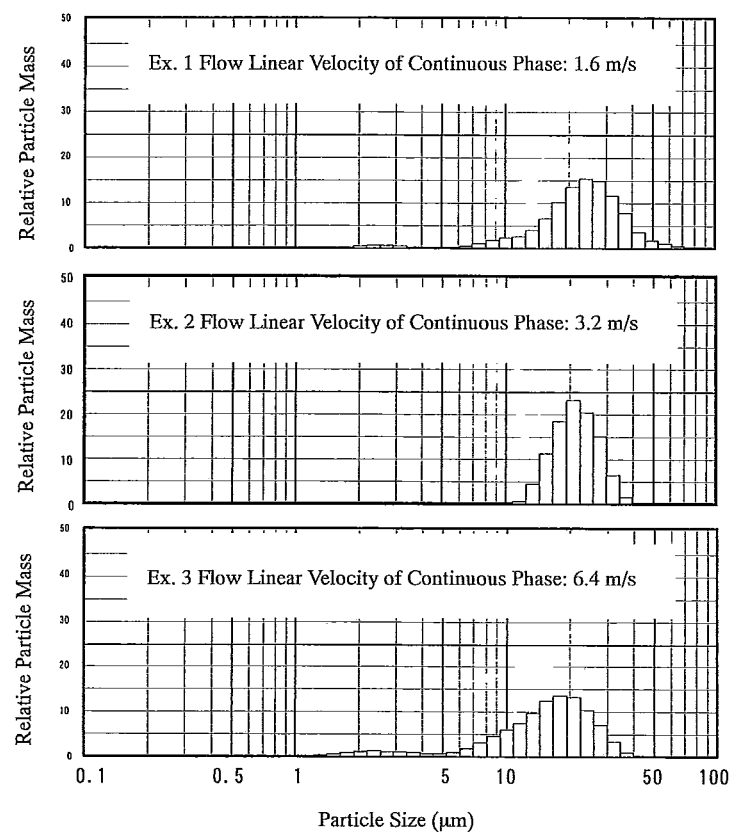
FIG. 6 is distribution charts showing the relative particle masses in Examples 1 to 3.

Methyl laurate was prepared as a disperse phase fluid and supplied to the swirling flow of the continuous phase liquid via the SPG membrane by use of another gear pump. The supply speed was 3.0 m$^3$/m$^2$·h. A composition according to the present invention, that is, an O/W emulsion, was thus produced. The size of the disperse phase particles in the resulting emulsion was analyzed by a laser diffraction scattering method (a product of Shimadzu Corp. was used; Product name: SALD-200V). The result on the relation between the relative particle mass and the particle size (the distribution of the relative particle mass) is shown in FIG. 6. The span (polydispersity) was 1.08 and the average particle size was 23.6 μm.

Example 2

The same procedure as in Example 1 was repeated to produce an emulsion and analyze it, except that the output of the pump was adjusted to set the flow linear velocity at 3.2 m/s. The distribution result of the relative particle mass is shown in FIG. 6. According to the result, the span was 0.64 and the average particle size was 21.3 μm.

Example 3

The same procedure as in Example 1 was repeated to produce an emulsion and analyze it, except that the flow linear velocity was 6.4 m/s. The distribution result of the relative particle mass is shown in FIG. 6. According to the result, the span (polydispersity) was 1.21 and the average particle size was 16.2 μm.

Figure 7:
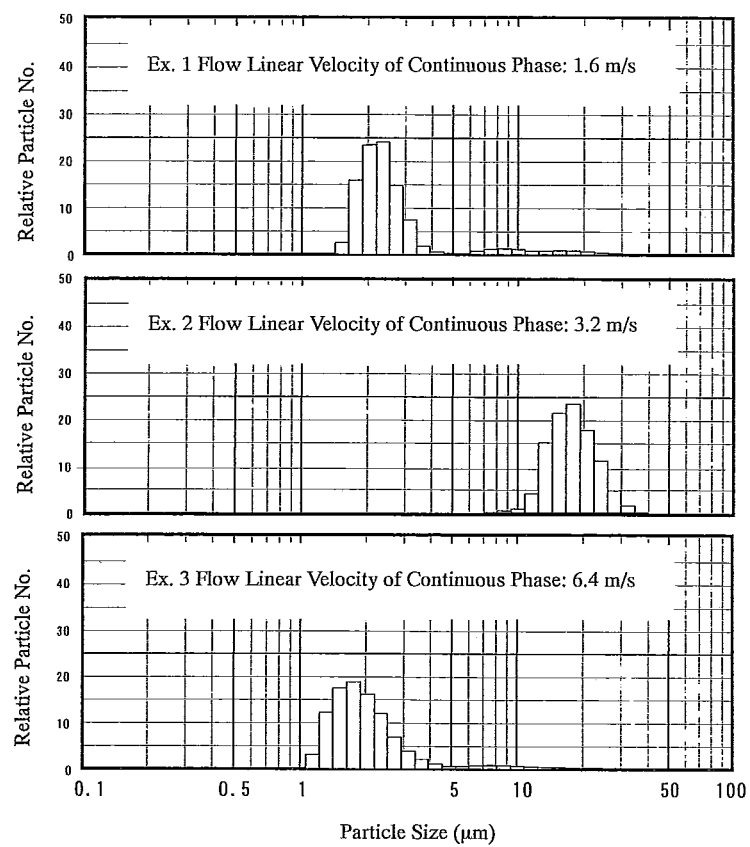
FIG. 7 is distribution charts showing the relative particle numbers in Examples 1 to 3.

According to the results obtained in Examples 1 to 3, when the flow linear velocity was 3.2 m/s, the span was the lowest. FIG. 7 shows the relation between the particle number and the particle size (the distribution of the relative particle number) for confirmation of the presence or absence of fine liquid particles (satellite liquid particles) generated in Examples 1 to 3. According to FIG. 7, the generation of fine liquid particles was not observed at the flow linear velocity of 3.2 m/s, whereas the generation of lots of fine liquid particles was demonstrated at the other linear velocities. This is consistent with the lowest polydispersity of the emulsion obtained at the flow linear velocity of 3.2 m/s.

Example 4

Figure 8:
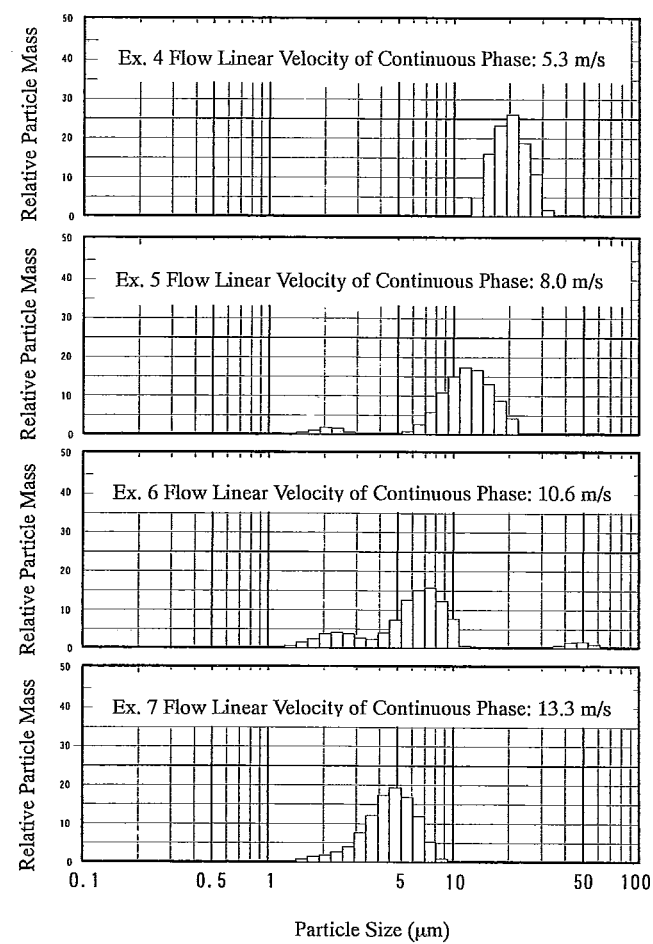
FIG. 8 is distribution charts showing the relative particle masses in Examples 4 to 7.

The same procedure as in Example 1 was repeated to produce an emulsion and analyze it, except for the average pore size of the SPG membrane of 1.0 μm, the supply speed of the disperse phase fluid of 0.6 m$^3$/m$^2$·h, and the flow linear velocity of 5.3 m/s. The distribution result of the relative particle mass is shown in FIG. 8. The span was 0.57 and the average particle size was 20.0 μm.

Example 5

The same procedure as in Example 4 was repeated to produce an emulsion and analyze it, except that the flow linear velocity was 8.0 m/s. The distribution result of the relative particle mass is shown in FIG. 8. The span was 1.01 and the average particle size was 12.2 μm.

Example 6

The same procedure as in Example 4 was repeated to produce an emulsion and analyze it, except that the flow linear velocity was 10.6 m/s. The distribution result of the relative particle mass is shown in FIG. 8. The span was 1.15 and the average particle size was 6.73 μm.

Example 7

The same procedure as in Example 4 was repeated to produce an emulsion and analyze it, except that the flow linear velocity was 13.3 m/s. The distribution result of the relative particle mass is shown in FIG. 8. The span was 0.81 and the average particle size was 4.64 μm.

Example 8

Figure 9:
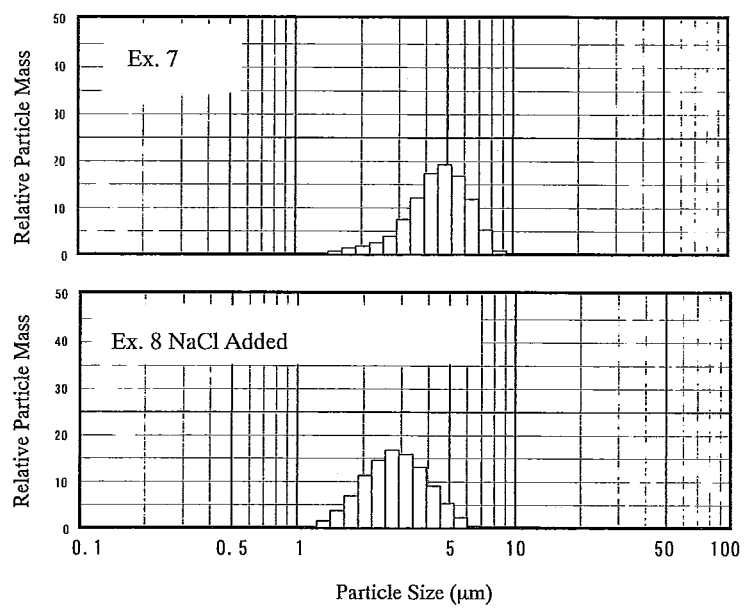
FIG. 9 is distribution charts showing the relative particle masses in Examples 7 and 8.

To 1.0% by mass of sodium dodecyl sulfate (SDS) solution, 3% by mass of sodium chloride was added to produce a continuous phase liquid. Except for this, the same conditions as in Example 7 were applied to produce an emulsion and analyze it. The distribution result of the relative particle mass is shown in FIG. 9, together with the result obtained in Example 7. For the emulsion of Example 7, the span was 0.81 and the average particle size was 4.64 μm, while for the emulsion of this example, the span was 0.91 and the average particle size was 2.82 μm. This result shows that the addition of an electrolyte such as sodium chloride to the continuous phase liquid reduces the size of the disperse phase particles. It was viewed that this was because the addition of sodium chloride promoted the formation of an electric double layer over the glass surface of the SPG membrane and this enhanced the electrostatic repulsion among the molecules of the anionic surfactant SDS, which covered the surface of the disperse phase oil particles which were being formed at the pore exits of the SPG membrane.

The results obtained in Examples 1 to 8 are summarized in Table 1.

TABLE 1

| Example | 1 | 2 | 3 | 4 | 5 | 6 | 7 | 8 |
| --- | --- | --- | --- | --- | --- | --- | --- | --- |
| Inflow Speed of Continuous Phase (m/s) | 1.6 | 3.2 | 6.4 | 5.3 | 8.0 | 10.6 | 13.3 | 13.3 |
| Supply Speed of Disperse Phase (m$^3$/m$^2$h) | 3.0 | 3.0 | 3.0 | 0.6 | 0.6 | 0.6 | 0.6 | 0.6 |
| Membrane Pore Size (μm) | 5.2 | 5.2 | 5.2 | 1.0 | 1.0 | 1.0 | 1.0 | 1.0 |
| Span | 1.08 | 0.64 | 1.21 | 0.57 | 1.01 | 1.15 | 0.81 | 0.91 |
| Average Particle Size (μm) | 23.6 | 21.3 | 16.2 | 20.0 | 12.2 | 6.73 | 4.64 | 2.82 |
| Remark | — | — | — | — | — | — | — | NaCl Added |

Continuous phase: 1.0% SDS solution
Disperse phase: methyl laurate

Example 9

Figure 10:
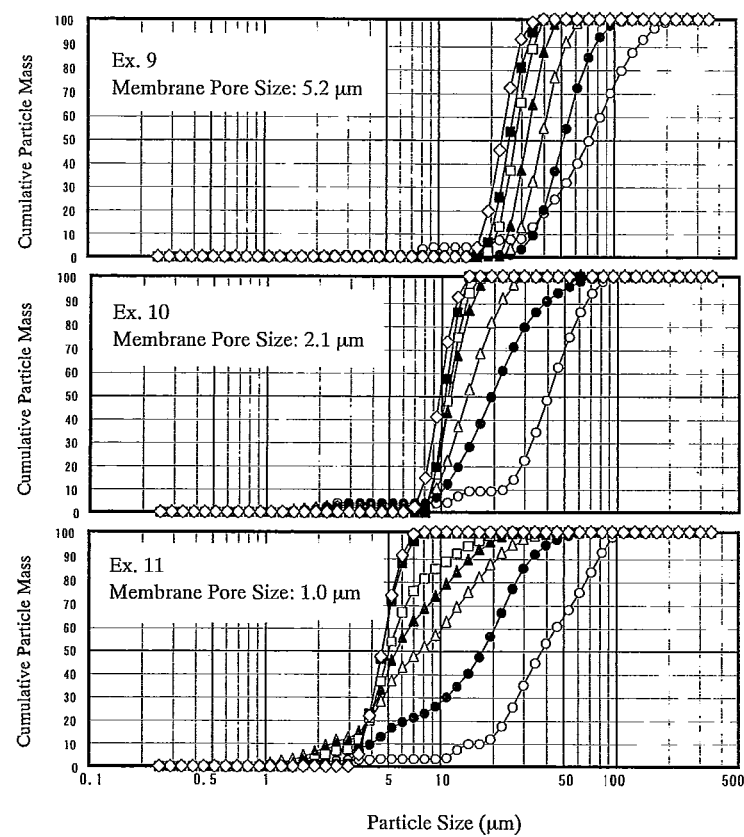
FIG. 10 is distribution charts showing the relative particle masses in Examples 9 to 11.

An aqueous solution containing 1.0% by mass of a surfactant Tween 20 (Nacalai Tesque, Inc.) was prepared to produce a continuous phase liquid. The same procedure as in Example 1 was repeated to produce an emulsion and analyze it, except that the average pore size of the SPG membrane was 5.2 μm, that the continuous phase liquid was flowed into the apparatus stated above at the flow linear velocities of 1.7, 3.4, 5.1, 6.8, 8.5, 10.2, and 11.2 m/s, and that the supply speed of the disperse phase fluid was 1.2 m$^3$/m$^2$·h. The distribution results of the relative particle masses are shown in FIG. 10. According to the results, the spans and the average particle sizes were as follows:

Flow linear velocity 1.7 m/s (○ (white circle)): 1.50, 72.3 μm

Flow linear velocity 3.4 m/s (● (black circle)): 0.84, 51.4 μm

Flow linear velocity 5.1 m/s (Δ (white triangle)): 0.62, 38.9 μm

Flow linear velocity 6.8 m/s (▲ (black triangle)): 0.53, 32.1 μm

Flow linear velocity 8.5 m/s (□ (white square)): 0.50, 27.6 μm

Flow linear velocity 10.2 m/s (■ (black square)): 0.51, 25.4 μm

Flow linear velocity 11.2 m/s (◇ (white rhombus)): 0.51, 22.9 μm

The above symbols such as ○ (white circle) correspond to the symbols in the drawing (the same applies to the examples shown below).

Example 10

The same procedure as in Example 9 was repeated to prepare an emulsion and analyze it, except that the average pore size of the SPG membrane was 2.1 μm. The distribution results of the relative particle masses are shown in FIG. 10. According to the results, the spans and the average particle sizes were as follows:

Flow linear velocity 1.7 m/s (○ (white circle)): 1.09, 40.8 μm

Flow linear velocity 3.4 m/s (● (black circle)): 1.53, 19.6 μm

Flow linear velocity 5.1 m/s (Δ (white triangle)): 0.91, 14.2 μm

Flow linear velocity 6.8 m/s (▲ (black triangle)): 0.58, 11.4 μm

Flow linear velocity 8.5 m/s (□ (white square)): 0.43, 10.9 μm

Flow linear velocity 10.2 m/s (■ (black square)): 0.41, 10.4 μm

Flow linear velocity 11.2 m/s (◇ (white rhombus)): 0.47, 9.77 μm

Example 11

The same procedure as in Example 9 was repeated to prepare an emulsion and analyze it, except that the average pore size of the SPG membrane was 1.0 μm. The distribution results of the relative particle masses are shown in FIG. 10. According to the results, the spans and the average particle sizes were as follows:

Flow linear velocity 1.7 m/s (○ (white circle)): 1.66, 38.1 μm

Flow linear velocity 3.4 m/s (● (black circle)): 1.69, 17.7 μm

Flow linear velocity 5.1 m/s (Δ (white triangle)): 2.48, 7.94 μm

Flow linear velocity 6.8 m/s (▲ (black triangle)): 2.28, 5.66 μm

Flow linear velocity 8.5 m/s (□ (white square)): 1.73, 5.09 μm

Flow linear velocity 10.2 m/s (■ (black square)): 0.61, 4.64 μm

Flow linear velocity 11.2 m/s (◇ (white rhombus)): 0.54, 4.61 μm

According to the results obtained in Examples 9 to 11, the average particle sizes decreased with increase in the flow linear velocities, and the spans were the lowest at the flow linear velocities of 10.2 m/s and 11.2 m/s. The span values are almost equivalent to the size dispersity of the pores formed in the SPG membrane, and thus these conditions are advantageous to minimize the dispersity of the particle size.

Comparative Example 1

Figure 4:
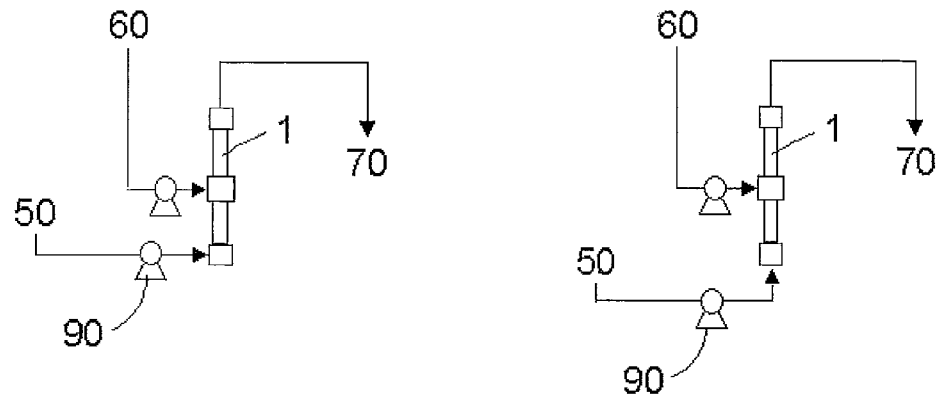
FIG. 4 is diagrams for a comparison between the inventive method and a conventional method.
Figure 11:
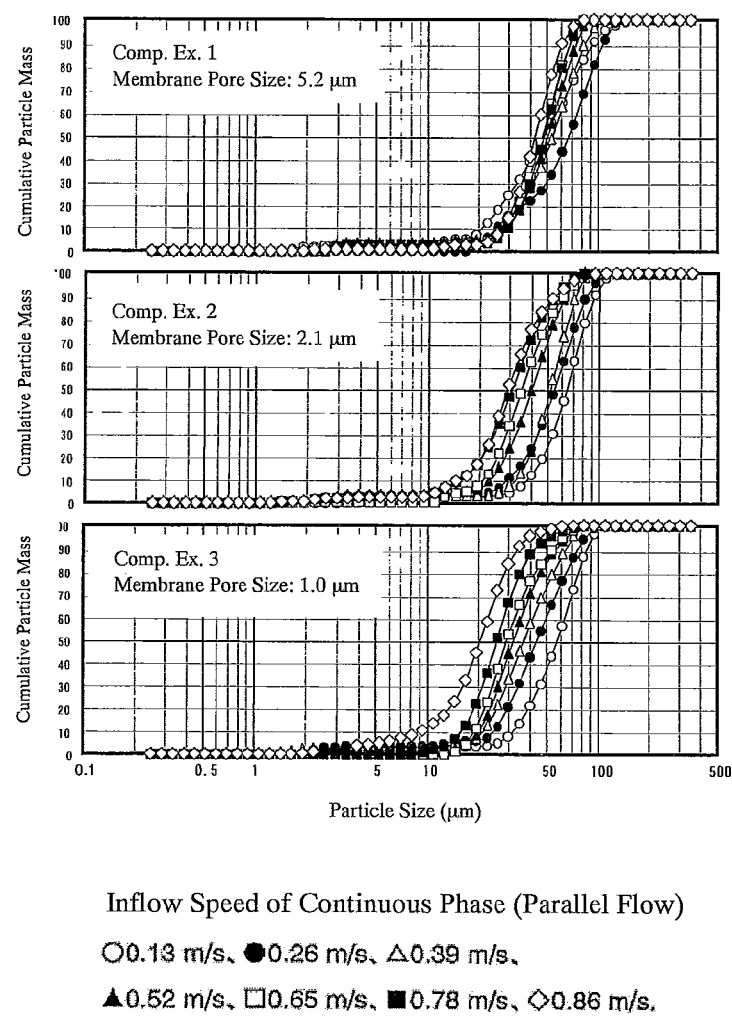
FIG. 11 is distribution charts showing the relative particle masses in Comparative Examples 1 to 3.

A production apparatus (FIG. 4(*b*)) was prepared in the same manner as in Example 1; the apparatus did not have the member 22 but had the members 32, each having an inlet for the continuous phase liquid and an outlet for the composition formed by fine dispersion, which were 4.5 mm in inner diameter, at the both ends of the cylindrical body 10. The same procedure as in Example 9 was repeated to produce an emulsion and analyze it, except that the continuous phase liquid was introduced to the cylindrical body 10 in parallel to its axis, with the liquid flowed in the cylindrical body 10 in parallel to its axis. The flow volume of the continuous phase liquid was the same as in Example 9. The linear velocities in the cylindrical body, which were defined as values obtained by dividing the flow volumes of the continuous phase liquid flowing in the cylindrical body by the inner diameter cross-sectional area of the cylindrical body, were 0.13, 0.26, 0.39, 0.52, 0.65, 0.78, and 0.86 m/s. The distribution results of the relative particle masses are shown in FIG. 11. According to the results, the spans and the average particle sizes were as follows:

Linear velocity in cylindrical body 0.13 m/s (○ (white circle)): 1.50, 48.2 μm

Linear velocity in cylindrical body 0.26 m/s (● (black circle)): 1.22, 66.9 μm

Linear velocity in cylindrical body 0.39 m/s (Δ (white triangle)): 1.06, 54.2 μm Linear velocity in cylindrical body 0.52 m/s (▲ (black triangle)): 0.91, 50.7 μm Linear velocity in cylindrical body 0.65 m/s (□ (white square)): 0.87, 47.1 μm Linear velocity in cylindrical body 0.78 m/s (■ (black square)): 0.81, 48.2 μm Linear velocity in cylindrical body 0.86 m/s (◇ (white rhombus)): 0.80, 42.7 μm A comparison between FIGS. 10 and 11 shows that flowing the continuous phase liquid in the form of swirling flow could reduce the average size and size polydispersity of the disperse phase particles.

Comparative Example 2

The same production apparatus as in Comparative Example 1 was prepared.

The same procedure as in Example 10 was repeated to produce an emulsion and analyze it, except that the continuous phase liquid was introduced to the cylindrical body 10 in parallel to its axis, with the liquid flowed in the cylindrical body 10 in parallel to its axis. The distribution results of the relative particle masses are shown in FIG. 11. According to the results, the spans and the average particle sizes were as follows:

Linear velocity in cylindrical body 0.13 m/s (○ (white circle)): 0.89, 64.2 μm

Linear velocity in cylindrical body 0.26 m/s (● (black circle)): 1.02, 54.6 μm

Linear velocity in cylindrical body 0.39 m/s (Δ (white triangle)): 0.79, 51.7 μm Linear velocity in cylindrical body 0.52 m/s (▲ (black triangle)): 1.00, 40.4 μm Linear velocity in cylindrical body 0.65 m/s (□ (white square)): 1.14, 35.2 μm Linear velocity in cylindrical body 0.78 m/s (■ (black square)): 1.29, 31.0 μm Linear velocity in cylindrical body 0.86 m/s (◇ (white rhombus)): 1.38, 29.2 μm A comparison between FIGS. 10 and 11 shows that flowing the continuous phase liquid in the form of swirling flow could reduce the average size and size polydispersity of the disperse phase particles.

Comparative Example 3

The same production apparatus as in Comparative Example 1 was prepared.

The same procedure as in Example 11 was repeated to produce an emulsion and analyze it, except that the continuous phase liquid was introduced to the cylindrical body 10 in parallel to its axis, with the liquid flowed in the cylindrical body 10 in parallel to its axis. The distribution results of the relative particle masses are shown in FIG. 11. According to the results, the spans and the average particle sizes were as follows:

Linear velocity in cylindrical body 0.13 m/s (○ (white circle)): 0.96, 57.4 μm

Linear velocity in cylindrical body 0.26 m/s (● (black circle)): 1.19, 43.7 μm

Linear velocity in cylindrical body 0.39 m/s (Δ (white triangle)): 1.19, 36.6 μm Linear velocity in cylindrical body 0.52 m/s (▲ (black triangle)): 1.16, 31.8 μm Linear velocity in cylindrical body 0.65 m/s (□ (white square)): 1.21, 29.0 μm Linear velocity in cylindrical body 0.78 m/s (■ (black square)): 1.05, 25.4 μm Linear velocity in cylindrical body 0.86 m/s (◇ (white rhombus)): 1.21, 20.4 μm A comparison between FIGS. 10 and 11 shows that flowing the continuous phase liquid in the form of swirling flow could reduce the average size and size polydispersity of the disperse phase particles.

The results obtained in Examples 9 to 11 are summarized in Table 2 and the results obtained in Comparative Examples 1 to 3 are summarized in Table 3.

TABLE 2

| | | | Inflow Speed of Continuous Phase (m/s) | | | | | | |
|---|---|---|---|---|---|---|---|---|---|
| | | | 1.7 | 3.4 | 5.1 | 6.8 | 8.5 | 10.2 | 11.2 |
| Ex. 9 | Membrane Pore Size 5.2 μm | Span | 1.50 | 0.84 | 0.62 | 0.53 | 0.50 | 0.51 | 0.51 |
| | | Average Particle Size (μm) | 72.3 | 51.4 | 38.9 | 32.1 | 27.6 | 25.4 | 22.9 |
| Ex. 10 | Membrane Pore Size 2.1 μm | Span | 1.09 | 1.53 | 0.91 | 0.58 | 0.43 | 0.41 | 0.47 |
| | | Average Particle Size (μm) | 40.8 | 19.6 | 14.2 | 11.4 | 10.9 | 10.4 | 9.77 |
| Ex. 11 | Membrane Pore Size 1.0 μm | Span | 1.66 | 1.69 | 2.48 | 2.28 | 1.73 | 0.61 | 0.54 |
| | | Average Particle Size (μm) | 38.1 | 17.7 | 7.94 | 5.66 | 5.09 | 4.64 | 4.61 |

Supply speed of disperse phase: 1.2 (m$^3$/m$^2$h)

TABLE 3

| | | | Linear Velocity in Cylindrical Body (m/s) | | | | | | |
|---|---|---|---|---|---|---|---|---|---|
| | | | 0.13 | 0.26 | 0.39 | 0.52 | 0.65 | 0.78 | 0.86 |
| Comp. Ex. 1 | Membrane Pore Size 5.2 μm | Span | 1.50 | 1.22 | 1.06 | 0.91 | 0.87 | 0.81 | 0.80 |
| | | Average Particle Size (μm) | 48.2 | 66.9 | 54.2 | 50.7 | 47.1 | 48.2 | 42.7 |
| Comp. Ex. 2 | Membrane Pore Size 2.1 μm | Span | 0.89 | 1.02 | 0.79 | 1.00 | 1.14 | 1.29 | 1.38 |
| | | Average Particle Size (μm) | 64.2 | 54.6 | 51.7 | 40.4 | 35.2 | 31.0 | 29.2 |
| Comp. Ex. 3 | Membrane Pore Size 1.0 μm | Span | 0.96 | 1.19 | 1.19 | 1.16 | 1.21 | 1.05 | 1.21 |
| | | Average Particle Size (μm) | 57.4 | 43.7 | 36.6 | 31.8 | 29.0 | 25.4 | 20.4 |

Supply speed of disperse phase: 1.2 (m$^3$/m$^2$h)

Example 12

The same apparatus as in Example 1 was used except that the average pore size of the SPG membrane was 2.1 µm. The disperse phase and continuous phase stated below were used to produce a composition in which the styrene monomer-containing disperse phase (liquid particles) was finely dispersed. The disperse phase used was a styrene solution containing 2.0% by mass of 2,2'-azobis(2,4-dimethyl valeronitrile) (ADVN) (Nacalai Tesque, Inc.) as a radical polymerization initiator. The continuous phase used was an aqueous solution containing 0.65% polyvinyl alcohol (polymerization degree: about 500) (Nacalai Tesque, Inc.), 0.05% by mass of sodium dodecyl sulfate (SDS), 0.03% by mass of sodium sulfate, and 0.04% by mass of hydroquinone.

In the same manner as in Example 1, the above continuous phase was flowed into the cylindrical body 10 at a flow linear velocity of 1.7 to 8.5 m/s to generate swirling flow and the above disperse phase was supplied at 1.2 $m^3/m^2 \cdot h$ to thereby form fine liquid particles in the continuous phase. When the flow linear velocity of the continuous phase liquid was 1.7 to 8.5 m/s, the span of the disperse phase particles was 0.99 to 0.44 and the size of the disperse phase particles could be well controlled. Particularly when the flow linear velocity was 5.1 to 8.5 m/s, the span could be reduced to 0.5 or less.

Figure 12:
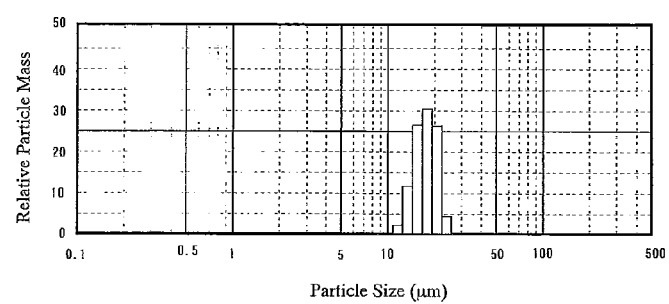
FIG. 12 is a distribution chart showing the relative particle mass in Example 12.
Figure 13:
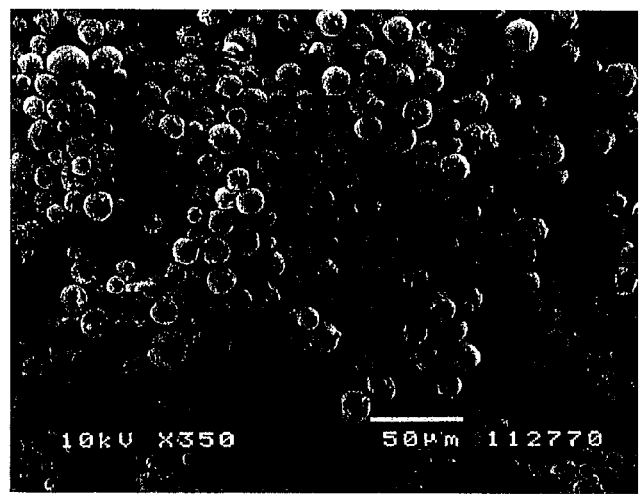
FIG. 13 is a scanning electron micrograph of the polystyrene fine particles in Example 12.

The thus prepared emulsion solution was allowed to stand at 70° C. for 6 hours for polymerization to produce a composition formed by fine dispersion of polystyrene fine particles as a disperse phase dispersed finely in the continuous phase. FIG. 12 shows the result of the size distribution measurement of the polystyrene fine particles dispersed in the continuous phase. The average particle size was 17.1 µm and the span was 0.44. This composition was filtered through a filter having a pore size of 0.5 µm on which the residues were then washed with a sufficient volume of water, and they were dried under reduced pressure to obtain polystyrene fine particle powder (FIG. 13). As described above, the present invention was shown to be important as a method which enables the mass production of monodisperse polymer fine particles.

Example 13

Figure 14:
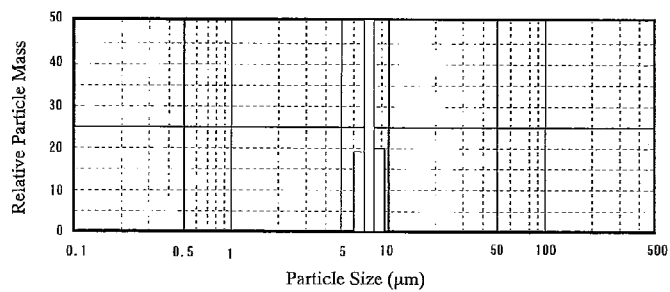
FIG. 14 is a distribution chart showing the relative particle mass of the polystyrene fine particles in Example 13.

The same procedure as in Example 12 was repeated to produce a composition formed by fine dispersion of polystyrene fine particles as a disperse phase dispersed finely in the continuous phase, except that 10% by mass of hexadecane was added as a stabilizer for the disperse phase liquid particles to the disperse phase liquid prepared in Example 12. FIG. 14 shows the result of the size distribution measurement of the polystyrene fine particles dispersed in the continuous phase. The average particle size was 7.5 µm and the span was 0.28. A comparison of this example with Example 12 showed that an appropriate choice of the pore size of the SPG membrane enabled the production of polymer fine particles having an intended size and that the addition of hexadecane as a stabilizer for the disperse phase liquid particles could effectively reduce the span of the size of the disperse phase particles generated.

Example 14

Figure 15:
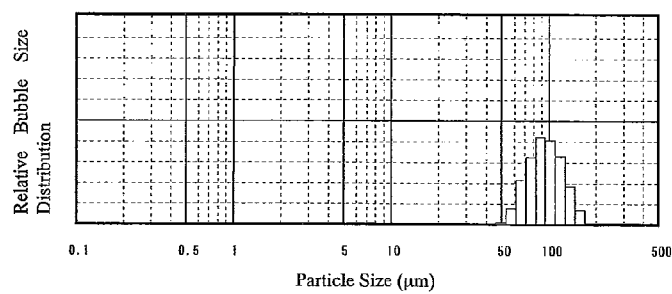
FIG. 15 is a distribution chart showing the relative size of microbubbles in Example 14.

The same apparatus as in Example 1 was used except that the average pore size of the SPG membrane was 2.1 µm. The disperse phase and continuous phase stated below were used to produce a microbubble composition. The continuous phase liquid used was 0.5% by mass of an aqueous SDS solution and the disperse phase used was nitrogen gas adjusted appropriately from a high-pressure cylinder under reduced pressure. In the same manner as in Example 1, the continuous phase liquid was flowed into the cylindrical body 10 to generate swirling flow and the nitrogen gas was supplied into the cylindrical body. The flow linear velocity of the continuous phase liquid was 6.8 m/s. The supply volume of the nitrogen gas was adjusted to between 100 and 0.1 in volume ratio of the continuous phase/the disperse phase gas (normal conditions). As a result, a composition containing microbubbles in the continuous phase (water) (aqueous solution) was obtained at a volume fraction of 100 to 5. The supply speed of the gas was 0.3 to 6 ($m^3/m^2 \cdot h$). In addition, when the volume ratio was 1 to 0.1, a substance formed by dense microbubbles was obtained in mousse form. At this time, the supply speed of the gas was 30 to 300 ($m^3/m^2 \cdot h$). FIG. 15 shows the result of the particle size distribution measurement of the microbubbles in the above composition.

REFERENCE SIGNS LIST

1 Production apparatus of the present invention
10 Cylindrical body
100 Porous membrane portion formed by a porous membrane at the circumferential surface of the cylindrical body
101 Non-porous membrane portion formed by another material at the circumferential surface of the cylindrical body
12 Inlet
14 Outlet
16 Inner wall surface
20 Inlet tube
22 Member
30 Outlet tube
32 Member
40 Disperse phase fluid reservoir
42 Disperse phase fluid inlet tube
44 Member
50 Continuous phase liquid
60 Disperse phase fluid
70 Composition
80 Seal ring

The invention claimed is:

1. A method of producing a composition having a continuous phase and a disperse phase dispersed finely in the continuous phase, the method comprising the steps of:
   (A) passing a swirling flow of the continuous phase liquid into a cylindrical body, the circumferential surface of which is either in part or entirely formed by a porous membrane;
   (B1) supplying the disperse phase fluid to the swirling flow via the porous membrane to form the particles of the disperse phase on the porous membrane; and
   (B2) detaching the disperse phase particles formed on the porous membrane by the shear force of the swirling flow,
   wherein the cylindrical body has an inlet for the continuous phase liquid on the circumferential surface of the cylindrical body in the vicinity of one end of the cylindrical body and an inlet tube which extends from the inlet in the substantially vertical direction to the axis of the cylindrical body and the tangential direction to the cylindrical body,
   wherein the step (A) is a step for passing the swirling flow by use of the inlet tube to allow the continuous phase liquid in from the substantially vertical direction to the axis of the cylindrical body and the tangential direction to the inner wall surface of the cylindrical body, wherein a flow linear velocity which is defined as a value obtained by dividing the flow volume of the continuous phase liquid in the inlet tube by the inner diameter cross-sectional area of the inlet tube is 1 to 40 m/s, and wherein the composition obtained has a span of 0.2 to 1.5, which is defined by the formula (1):

$$\text{Span}=(d_{90}-d_{10})/d_{50} \qquad (1),$$

wherein
- $d_{10}$ represents a particle size at a cumulative disperse phase particle distribution of 10%,
- $d_{90}$ represents a particle size at a cumulative disperse phase particle distribution of 90%, and
- $d_{50}$ represents a particle size at a cumulative disperse phase particle distribution of 50%.

2. A method of producing a composition having a continuous phase and a disperse phase dispersed finely in the continuous phase, the method comprising the steps of:
   (A) passing a swirling flow of the continuous phase liquid into a cylindrical body, the circumferential surface of which is either in part or entirely formed by a porous membrane;
   (B1) supplying the disperse phase fluid to the swirling flow via the porous membrane to faun the particles of the disperse phase on the porous membrane; and
   (B2) detaching the disperse phase particles formed on the porous membrane by the shear force of the swirling flow, wherein the cylindrical body has an inlet for the continuous phase liquid on the circumferential surface of the cylindrical body in the vicinity of one end of the cylindrical body and an inlet tube which extends from the inlet in the substantially vertical direction to the axis of the cylindrical body and the tangential direction to the cylindrical body, wherein the step (A) is a step for passing the swirling flow by use of the inlet tube to allow the continuous phase liquid in from the substantially vertical direction to the axis of the cylindrical body and the tangential direction to the inner wall surface of the cylindrical body, wherein when the inner diameter cross-sectional area of the cylindrical body is defined as S1 and the inner diameter cross-sectional area of the inlet tube is defined as S2, an area ratio S1/S2 is 4 to 64, and wherein the composition obtained has a span of 0.2 to 1.5, which is defined by the formula (1):

$$\text{Span}=(d_{90}-d_{10})/d_{50} \qquad (1),$$

wherein
- $d_{10}$ represents a particle size at a cumulative disperse phase particle distribution of 10%,
- $d_{90}$ represents a particle size at a cumulative disperse phase particle distribution of 90%, and
- $d_{50}$ represents a particle size at a cumulative disperse phase particle distribution of 50%.

3. A method of producing a composition having a continuous phase and a disperse phase dispersed finely in the continuous phase, the method comprising the steps of:
   (A) passing a swirling flow of the continuous phase liquid into a cylindrical body, the circumferential surface of which is either in part or entirely formed by a porous membrane;
   (B1) supplying the disperse phase fluid to the swirling flow via the porous membrane to form the particles of the disperse phase on the porous membrane; and
   (B2) detaching the disperse phase particles formed on the porous membrane by the shear force of the swirling flow, wherein the cylindrical body has an inlet for the continuous phase liquid on the circumferential surface of the cylindrical body in the vicinity of one end of the cylindrical body and an inlet tube which extends from the inlet in the substantially vertical direction to the axis of the cylindrical body and the tangential direction to the cylindrical body, wherein the step (A) is a step for passing the swirling flow by use of the inlet tube to allow the continuous phase liquid in from the substantially vertical direction to the axis of the cylindrical body and the tangential direction to the inner wall surface of the cylindrical body, wherein when the inner diameter of the cylindrical body is defined as X1 and the inner diameter of the inlet tube which is circular in cross-section is defined as X2, an inner diameter ratio X1/X2 is 2 to 8, and wherein the composition obtained has a span of 0.2 to 1.5, which is defined by the formula (1):

$$\text{Span}=(d_{90}-d_{10})/d_{50} \qquad (1),$$

wherein
- $d_{10}$ represents a particle size at a cumulative disperse phase particle distribution of 10%,
- $d_{90}$ represents a particle size at a cumulative disperse phase particle distribution of 90%, and
- $d_{50}$ represents a particle size at a cumulative disperse phase particle distribution of 50%.

4. A method of producing a composition having a continuous phase and a disperse phase dispersed finely in the continuous phase, the method comprising the steps of:
   (A) passing a swirling flow of the continuous phase liquid into a cylindrical body, the circumferential surface of which is either in part or entirely formed by a porous membrane;
   (B1) supplying the disperse phase fluid to the swirling flow via the porous membrane to form the particles of the disperse phase on the porous membrane; and
   (B2) detaching the disperse phase particles formed on the porous membrane by the shear force of the swirling flow, wherein the cylindrical body has an inlet for the continuous phase liquid on the circumferential surface of the cylindrical body in the vicinity of one end of the cylindrical body and an inlet tube which extends from the inlet in the substantially vertical direction to the axis of the cylindrical body and the tangential direction to the cylindrical body, wherein the step (A) is a step for passing the swirling flow by use of the inlet tube to allow the continuous phase liquid in from the substantially vertical direction to the axis of the cylindrical body and the tangential direction to the inner wall surface of the cylindrical body, wherein when the inner diameter of the cylindrical body is defined as X1 and the inner diameter of a circular outlet for ejection of the composition placed on the cross-sectional surface of the other end of the cylindrical body is defined as X0, an inner diameter ratio X1/X0 is 1 to 5, and wherein the composition obtained has a span of 0.2 to 1.5, which is defined by the formula (1):

$$\text{Span}=(d_{90}-d_{10})/d_{50} \qquad (1),$$

wherein
- $d_{10}$ represents a particle size at a cumulative disperse phase particle distribution of 10%,
- $d_{90}$ represents a particle size at a cumulative disperse phase particle distribution of 90%, and $d_{50}$ represents a particle size at a cumulative disperse phase particle distribution of 50%.

5. A method of producing a composition having a continuous phase and a disperse phase dispersed finely in the continuous phase, the method comprising the steps of:
   (A) passing a swirling flow of the continuous phase liquid into a cylindrical body, the circumferential surface of which is either in part or entirely formed by a porous membrane;
   (B1) supplying the disperse phase fluid to the swirling flow via the porous membrane to form the particles of the disperse phase on the porous membrane; and
   (B2) detaching the disperse phase particles formed on the porous membrane by the shear force of the swirling flow, wherein the continuous phase liquid is a water-based liquid and the disperse phase fluid is an oil-based liquid, and the composition obtained is an O/W emulsion, and
   wherein the composition obtained has a span of 0.2 to 1.5, which is defined by the formula (1):

$$\text{Span}=(d_{90}-d_{10})/d_{50} \qquad (1),$$

wherein
   $d_{10}$ represents a particle size at a cumulative disperse phase particle distribution of 10%,
   $d_{90}$ represents a particle size at a cumulative disperse phase particle distribution of 90%, and
   $d_{50}$ represents a particle size at a cumulative disperse phase particle distribution of 50%.

6. A method of producing a composition having a continuous phase and a disperse phase dispersed finely in the continuous phase, the method comprising the steps of:
   (A) passing a swirling flow of the continuous phase liquid into a cylindrical body, the circumferential surface of which is either in part or entirely formed by a porous membrane;
   (B1) supplying the disperse phase fluid to the swirling flow via the porous membrane to form the particles of the disperse phase on the porous membrane; and
   (B2) detaching the disperse phase particles formed on the porous membrane by the shear force of the swirling flow, wherein the continuous phase liquid is an oil-based liquid and the disperse phase fluid is a water-based liquid, and the composition obtained is a W/O emulsion, and
   wherein the composition obtained has a span of 0.2 to 1.5, which is defined by the formula (1):

$$\text{Span}=(d_{90}-d_{10})/d_{50} \qquad (1),$$

wherein
   $d_{10}$ represents a particle size at a cumulative disperse phase particle distribution of 10%,
   $d_{90}$ represents a particle size at a cumulative disperse phase particle distribution of 90%, and
   $d_{50}$ represents a particle size at a cumulative disperse phase particle distribution of 50%.

7. A method of producing polymer fine particles, the method comprising the steps of:
   (D) passing the swirling flow of a continuous phase liquid into a cylindrical body the circumferential surface of which is either in part or entirely formed by a porous membrane;
   (E1) supplying a disperse phase liquid containing polymerizable monomers to the swirling flow via the porous membrane to form the particles of the disperse phase on the porous membrane;
   (E2) detaching the disperse phase particles formed on the porous membrane by the shear force of the swirling flow;
   (F) obtaining a polymerizable composition having the continuous phase and the disperse phase dispersed finely in the continuous phase; and
   (G) polymerizing the polymerizable composition.

8. The method of claim 7, wherein the cylindrical body has an inlet for the continuous phase liquid on the circumferential surface of the cylindrical body in the vicinity of one end of the cylindrical body and an inlet tube which extends from the inlet in the substantially vertical direction to the axis of the cylindrical body and the tangential direction to the cylindrical body, and
   wherein the step (D) is a step for passing the swirling flow by use of the inlet tube to allow the continuous phase liquid in from the substantially vertical direction to the axis of the cylindrical body and the tangential direction to the inner wall surface of the cylindrical body.

9. An apparatus for producing a composition having a continuous phase and a disperse phase dispersed finely in the continuous phase, the apparatus comprising:
   a cylindrical body, the circumferential surface of which is either in part or entirely formed by a porous membrane, the cylindrical body having an inlet for a continuous phase liquid on the circumferential surface of the cylindrical body in the vicinity of one end of the cylindrical body and an outlet for the composition having the continuous phase and the disperse phase dispersed finely in the continuous phase which is placed on the cross-sectional surface of the other end of the cylindrical body;
   a disperse phase fluid reservoir provided on the outer side of the circumferential surface of the cylindrical body;
   a supply means for supplying the disperse phase fluid into the cylindrical body from the disperse phase fluid reservoir; and
   an inlet tube which is connected to the inlet and which extends in the substantially vertical direction to the axis of the cylindrical body and the tangential direction to the cylindrical body, so that the continuous phase liquid flows in from the substantially vertical direction to the axis of the cylindrical body and the tangential direction to the inner wall surface of the cylindrical body to generate swirling flow by the shear force of which the particles of the disperse phase formed on the porous membrane can be detached,
   wherein when the inner diameter cross-sectional area of the cylindrical body is defined as S1 and the inner diameter cross-sectional area of the inlet tube is defined as S2, an area ratio S1/S2 is 4 to 64.

10. An apparatus for producing a composition having a continuous phase and a disperse phase dispersed finely in the continuous phase, the apparatus comprising:
   a cylindrical body, the circumferential surface of which is either in part or entirely formed by a porous membrane, the cylindrical body having an inlet for a continuous phase liquid on the circumferential surface of the cylindrical body in the vicinity of one end of the cylindrical body and an outlet for the composition having the continuous phase and the disperse phase dispersed finely in the continuous phase which is placed on the cross-sectional surface of the other end of the cylindrical body;
   a disperse phase fluid reservoir provided on the outer side of the circumferential surface of the cylindrical body;
   a supply means for supplying the disperse phase fluid into the cylindrical body from the disperse phase fluid reservoir; and
   an inlet tube which is connected to the inlet and which extends in the substantially vertical direction to the axis of the cylindrical body and the tangential direction to the cylindrical body, so that the continuous phase liquid flows in from the substantially vertical direction to the axis of the cylindrical body and the tangential direction to the inner wall surface of the cylindrical body to generate swirling flow by the shear force of which the particles of the disperse phase formed on the porous membrane can be detached, wherein when the inner diameter of the cylindrical body is defined as X1 and the inner diameter of the inlet tube which is circular in cross-section is defined as X2, an inner diameter ratio X1/X2 is 2 to 8.

11. An apparatus for producing a composition having a continuous phase and a disperse phase dispersed finely in the continuous phase, the apparatus comprising:

a cylindrical body, the circumferential surface of which is either in part or entirely formed by a porous membrane, the cylindrical body having an inlet for a continuous phase liquid on the circumferential surface of the cylindrical body in the vicinity of one end of the cylindrical body and an outlet for the composition having the continuous phase and the disperse phase dispersed finely in the continuous phase which is placed on the cross-sectional surface of the other end of the cylindrical body;

a disperse phase fluid reservoir provided on the outer side of the circumferential surface of the cylindrical body;

a supply means for supplying the disperse phase fluid into the cylindrical body from the disperse phase fluid reservoir; and an inlet tube which is connected to the inlet and which extends in the substantially vertical direction to the axis of the cylindrical body and the tangential direction to the cylindrical body, so that the continuous phase liquid flows in from the substantially vertical direction to the axis of the cylindrical body and the tangential direction to the inner wall surface of the cylindrical body to generate swirling flow by the shear force of which the particles of the disperse phase formed on the porous membrane can be detached, wherein when the inner diameter of the cylindrical body is defined as X1 and the inner diameter of the outlet which has a circular shape is defined as X0, an inner diameter ratio X1/X0 is 1 to 5.

12. The method of claim 1, wherein the continuous phase liquid is an oil-based liquid and the disperse phase fluid is a gas, and the composition obtained is a microbubble composition comprising the continuous phase and the gas dispersed finely in the continuous phase.

13. The method of claim 2, wherein the continuous phase liquid is an oil-based liquid and the disperse phase fluid is a gas, and the composition obtained is a microbubble composition comprising the continuous phase and the gas dispersed finely in the continuous phase.

14. The method of claim 3, wherein the continuous phase liquid is an oil-based liquid and the disperse phase fluid is a gas, and the composition obtained is a microbubble composition comprising the continuous phase and the gas dispersed finely in the continuous phase.

15. The method of claim 4, wherein the continuous phase liquid is an oil-based liquid and the disperse phase fluid is a gas, and the composition obtained is a microbubble composition comprising the continuous phase and the gas dispersed finely in the continuous phase.

16. The method of claim 5, wherein the continuous phase liquid is an oil-based liquid and the disperse phase fluid is a gas, and the composition obtained is a microbubble composition comprising the continuous phase and the gas dispersed finely in the continuous phase.

17. The method of claim 6, wherein the continuous phase liquid is an oil-based liquid and the disperse phase fluid is a gas, and the composition obtained is a microbubble composition comprising the continuous phase and the gas dispersed finely in the continuous phase.

* * * * *